(12) United States Patent
Ito et al.

(10) Patent No.: US 12,399,060 B2
(45) Date of Patent: Aug. 26, 2025

(54) DETECTION DEVICE WITH LIGHT DIRECTIVITY

(71) Applicant: Magnolia White Corporation, Tokyo (JP)

(72) Inventors: Kaoru Ito, Tokyo (JP); Akihiko Fujisawa, Tokyo (JP); Daichi Abe, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

(21) Appl. No.: 18/603,479

(22) Filed: Mar. 13, 2024

(65) Prior Publication Data

US 2024/0328855 A1    Oct. 3, 2024

(30) Foreign Application Priority Data

Mar. 27, 2023  (JP) .................... 2023-049613

(51) Int. Cl.
  *G01J 1/44*  (2006.01)
  *G01J 1/08*  (2006.01)
  (Continued)

(52) U.S. Cl.
  CPC . *G01J 1/44* (2013.01); *G01J 1/08* (2013.01); *G01J 2001/446* (2013.01);
  (Continued)

(58) Field of Classification Search
  CPC .......... G01N 15/1459; G01N 15/0205; G01N 15/1433; G01N 21/6456; G01N 2021/6419; G01N 2021/6421; G01N 15/149; G01N 2015/0294; G01N 2015/1006; G01N 2015/1493; G01N 2015/1497; G01N 15/1429; G01N 15/147; G01N 15/1434; G01N 2021/6482; G01N 2201/12746;
  (Continued)

(56) References Cited

U.S. PATENT DOCUMENTS

| | | | | |
|---|---|---|---|---|
| 4,559,452 A | * | 12/1985 | Igaki | G07D 7/162 |
| | | | | 356/637 |
| 11,897,750 B2 | * | 2/2024 | Checchinato | A47J 31/44 |
| 2022/0118136 A1 | * | 4/2022 | Church | A61M 1/3681 |

FOREIGN PATENT DOCUMENTS

JP    H06-261737 A    9/1994

* cited by examiner

*Primary Examiner* — Jennifer D Bennett
(74) *Attorney, Agent, or Firm* — K&L Gates LLP

(57) ABSTRACT

A detection device includes: a planar detection device including photodetection elements; point light sources provided correspondingly to the photodetection elements; a light directivity control element disposed between the point light sources and the photodetection elements; and a detection circuit electrically coupled to the photodetection elements. Each point light source corresponds to at least one of the photodetection elements. In a light amount setting mode, the point light sources are lit up at different light amounts; the photodetection elements output sensor values corresponding to the different light amounts; the sensor values that are detected are compared with a preset target sensor value; and light amounts for detection of the point light sources are set. In a detection mode, the point light sources are lit up at the set light amounts for detection; and the photodetection elements output sensor values corresponding to the light amounts for detection.

14 Claims, 17 Drawing Sheets

(51) Int. Cl.
 *G01N 15/0205* (2024.01)
 *G01N 15/14* (2006.01)
 *G01N 15/1434* (2024.01)
(52) U.S. Cl.
 CPC .... *G01J 2001/448* (2013.01); *G01N 15/0205* (2013.01); *G01N 15/1434* (2013.01); *G01N 15/147* (2013.01); *G01N 2201/12746* (2013.01)
(58) Field of Classification Search
 CPC .......... G01J 1/44; G01J 1/08; G01J 2001/446; G01J 2001/448
 See application file for complete search history.

DETECTION DEVICE WITH LIGHT DIRECTIVITY

CROSS-REFERENCE TO RELATED APPLICATION

This application claims the benefit of priority from Japanese Patent Application No. 2023-049613 filed on Mar. 27, 2023, the entire contents of which are incorporated herein by reference.

BACKGROUND

1. Technical Field

What is disclosed herein relates to a detection device.

2. Description of the Related Art

Japanese Patent Application Laid-open Publication No. H06-261737 (JP-A-H06-261737) discloses a biosensor that includes a solid-state imaging device, a culture vessel held above an imaging surface of this solid-state imaging device, cells and a culture medium for growing the cells contained in this culture vessel, and a light-emitting element to emit light into the culture vessel. In the biosensor of JP-A-H06-261737, the light emitted from the light-emitting element enters the solid-state imaging device through the culture medium and the cells (objects to be detected) in the culture vessel.

In such a detection device, a light source is required to emit light at a light amount depending on characteristics of a detection element. The amount of light applied to the detection element varies depending on the types and conditions (thicknesses, turbidity, and so on) of the objects to be detected, the culture vessel, and the culture medium because the light is applied to the detection element through the objects to be detected, the culture vessel, and the culture medium. As a result, light at an amount different from that within a detection range of the detection element may be emitted, thereby reducing the detection accuracy.

For the foregoing reasons, there is a need for a detection device capable of improving the detection accuracy.

SUMMARY

According to an aspect, a detection device includes: a planar detection device including a plurality of photodetection elements arranged in a planar configuration; a plurality of point light sources provided correspondingly to the photodetection elements; a light directivity control element disposed between the point light sources and the photodetection elements; and a detection circuit electrically coupled to the photodetection elements. Each of the point light sources corresponds to at least one of the photodetection elements. In a light amount setting mode, the point light sources are controlled to be lit up at different light amounts; the photodetection elements are configured to output a plurality of sensor values corresponding to the different light amounts; the sensor values that are detected are compared with a preset target sensor value; and light amounts for detection of the point light sources are set. In a detection mode, the point light sources are controlled to be lit up at the set light amounts for detection; and the photodetection elements are configured to output sensor values corresponding to the light amounts for detection.

DETAILED DESCRIPTION

Figure 1:
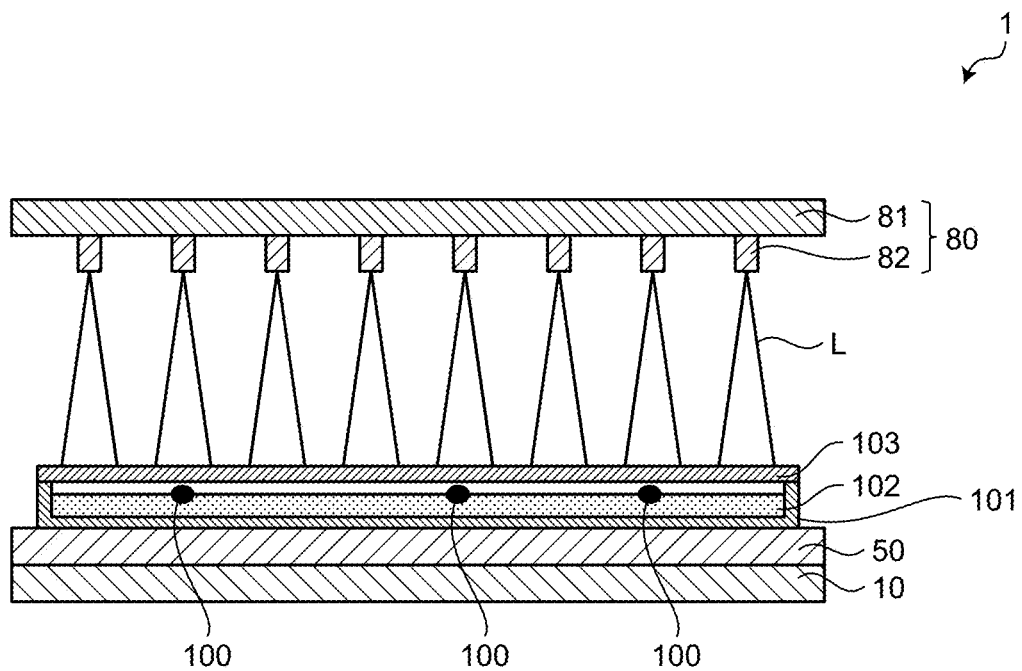
FIG. 1 is a sectional view schematically illustrating a detection device according to an embodiment.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

Embodiment

FIG. 1 is a sectional view schematically illustrating a detection device according to an embodiment. As illustrated in FIG. 1, a detection device 1 includes an optical sensor 10, an optical filter layer 50, a placement substrate 101 and a cover member 103 for placing objects to be detected 100, and a light source device 80. The optical filter layer 50, the placement substrate 101 and the cover member 103 (objects to be detected 100), and the light source device 80 are arranged in this order on the optical sensor 10.

Each of the object to be detected 100 is a micro-object such as a bacterium. The detection device 1 is a biosensor that detects the micro-object such as the bacterium. The placement substrate 101 is a light-transmitting plate-like member formed of glass, for example. The objects to be detected 100 are placed together with a culture medium 102 on the placement substrate 101. The cover member 103 covering the objects to be detected 100 is provided on the upper side of the placement substrate 101. The placement substrate 101 and the cover member 103 are a Petri dish, for example. The objects to be detected 100 serving as detection targets are placed on the placement substrate 101 and placed between the optical sensor 10 and the light source device 80.

The objects to be detected 100 are not limited to the bacteria and may be other micro-objects such as cells. The detection device 1 is not limited to a biosensor and may be configured as, for example, a fingerprint detection device that detects a fingerprint or a vein detection device that detects a vascular pattern of, for example, veins. In this case, the object to be detected 100 may be a living body such as a finger, a palm, or a wrist.

The optical sensor 10 is a planar detection device that includes a plurality of photodiodes 30 (photodetection elements) arranged in a planar configuration. A detailed configuration of the optical sensor 10 will be described later with reference to FIG. 2 and FIGS. 5 and 6.

The optical filter layer 50 is a light directivity control element disposed between a plurality of light-emitting elements 82 (light source device 80) and the photodiodes 30 (optical sensor 10). More specifically, the optical filter layer 50 is provided between the photodiodes 30 of the optical sensor 10 and the placement substrate 101. The optical filter layer 50 is disposed so as to face the photodiodes 30 of the optical sensor 10. The optical filter layer 50 is an optical element that transmits components of light L emitted from the light-emitting elements 82 that travel in a direction orthogonal to the optical sensor 10 toward the photodiodes 30. The optical filter layer 50 is also called collimating apertures or a collimator.

The light source device 80 includes a light source substrate 81 and the light-emitting elements 82. The light-emitting elements 82 are point light sources provided correspondingly to the photodiodes 30 of the optical sensor 10. The light-emitting elements 82 are provided on the light source substrate 81 and arranged so as to face the photodiodes 30 of the optical sensor 10. The light-emitting elements 82 are each made of a light-emitting diode (LED), for example.

The light L emitted from the light-emitting elements 82 passes through the placement substrate 101, the culture medium 102, the cover member 103, and the optical filter layer 50, and is transmitted toward the photodiodes 30 of the optical sensor 10. The amounts of light received by the photodiodes 30 differ between areas overlapping the objects to be detected 100 and areas not overlapping the objects to be detected 100. As a result, the optical sensor 10 can image the objects to be detected 100.

In the present embodiment, the light-emitting elements 82 serving as the point light sources are arranged at a predetermined pitch. As a result, compared with a case of providing a surface light source, the direction of the light L is restrained from varying, thus enabling better imaging. The arrangement pitch of the light-emitting elements 82 is set so as to reduce interference of the light L emitted from the adjacent light-emitting elements 82. In addition, the optical sensor 10 is irradiated with the light L, of which the viewing angle is limited by the optical filter layer 50. The arrangement pitch of the photodiodes 30 is set so as to ensure the light-receiving area of the optical sensor 10.

Figure 2:
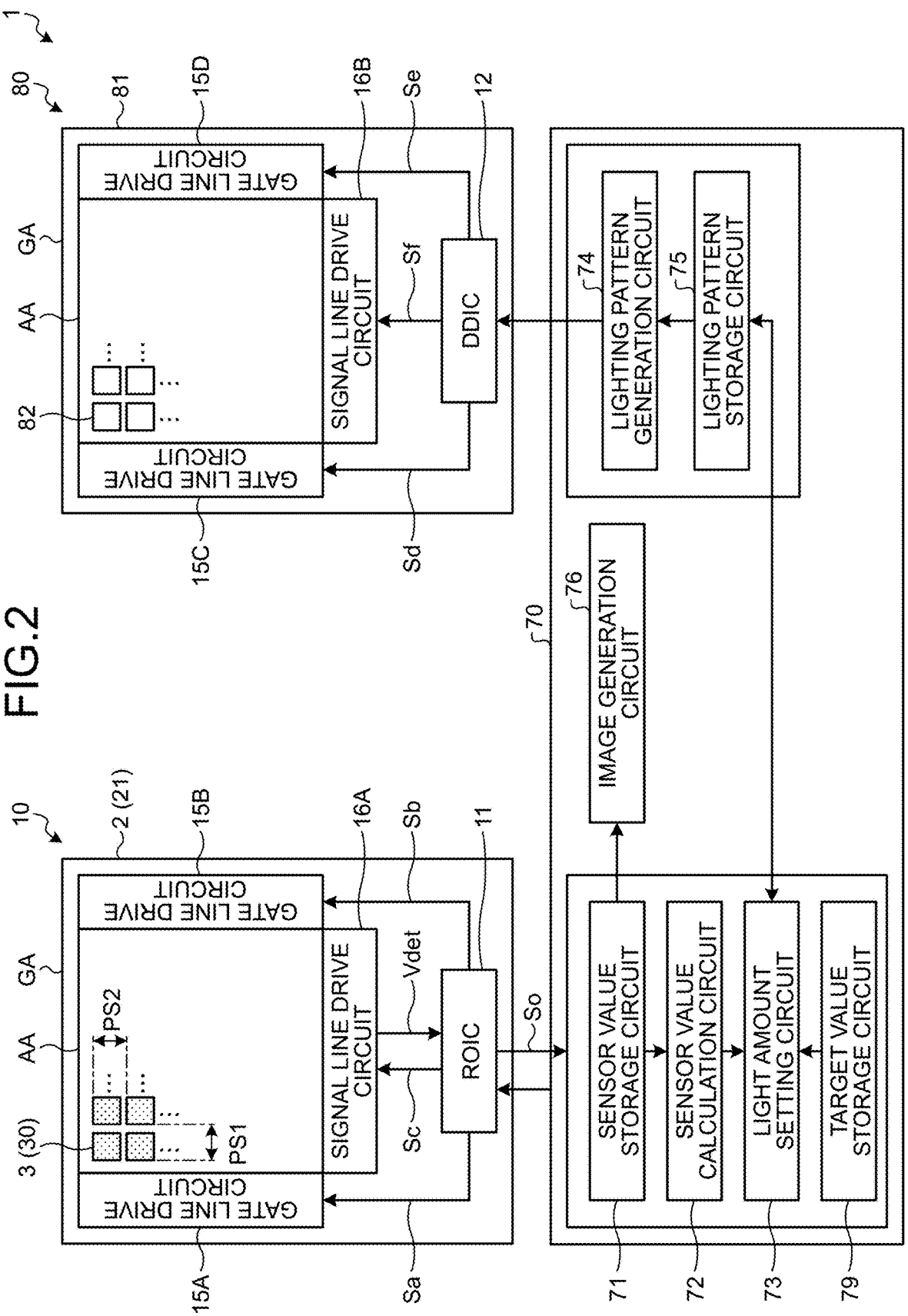
FIG. 2 is a block diagram illustrating a configuration example of the detection device according to the embodiment.

FIG. 2 is a block diagram illustrating a configuration example of the detection device according to the embodiment. As illustrated in FIG. 2, the detection device 1 further includes a host integrated circuit (IC) 70 that controls the optical sensor 10 and the light source device 80. The optical sensor 10 includes an array substrate 2, a plurality of sensor pixels 3 (photodiodes 30) formed on the array substrate 2, gate line drive circuits 15A and 15B, a signal line drive circuit 16A, and a detection control circuit 11.

The array substrate 2 is formed using a substrate 21 as a base. Each of the sensor pixels 3 is configured with a corresponding one of the photodiodes 30, a plurality of transistors, and various types of wiring. The array substrate 2 with the photodiodes 30 formed thereon is a drive circuit board for driving the sensor for each predetermined detection area, and is also called a backplane or an active matrix substrate.

The substrate 21 has a detection area AA and a peripheral area GA. The detection area AA is an area provided with the sensor pixels 3 (photodiodes 30). The peripheral area GA is an area between the outer perimeter of the detection area AA and the outer edges of the substrate 21 and is an area not provided with the sensor pixels 3. The gate line drive circuits 15A and 15B, the signal line drive circuit 16A, and the detection control circuit 11 are provided in the peripheral area GA.

Each of the sensor pixels 3 is an optical sensor including the photodiode 30 as a sensor element. Each of the photodiodes 30 outputs an electrical signal corresponding to light emitted thereto. More specifically, the photodiode 30 is a positive-intrinsic-negative (PIN) photodiode or an organic photodiode (OPD) using an organic semiconductor. The sensor pixels 3 (photodiodes 30) are arranged in a matrix having a row-column configuration in the detection area AA.

The detection control circuit 11 is a circuit that supplies control signals Sa, Sb, and Sc to the gate line drive circuits 15A and 15B, and the signal line drive circuit 16A, respectively, to control operations of these circuits. Specifically, the gate line drive circuits 15A and 15B output gate drive signals to sensor gate lines GLS (refer to FIG. 4) based on the control signals Sa and Sb. The signal line drive circuit 16A electrically couples a sensor signal line SLS selected based on the control signal Sc to the detection control circuit 11. The detection control circuit 11 includes a signal processing circuit that performs signal processing of a detection signal Vdet from each of the photodiodes 30.

The photodiodes 30 included in the sensor pixels 3 perform detection in response to the gate drive signals supplied from the gate line drive circuits 15A and 15B. Each of the photodiodes 30 outputs the electrical signal corresponding to the light emitted thereto as the detection signal Vdet to the signal line drive circuit 16A. The detection control circuit 11 (detection circuit) is electrically coupled to the photodiodes 30. The detection control circuit 11 performs the signal processing of the detection signals Vdet from the photodiodes 30, and outputs sensor values So based on the detection signals Vdet to the host IC 70. This operation causes the detection device 1 to detect information on the object to be detected 100.

Figure 3:
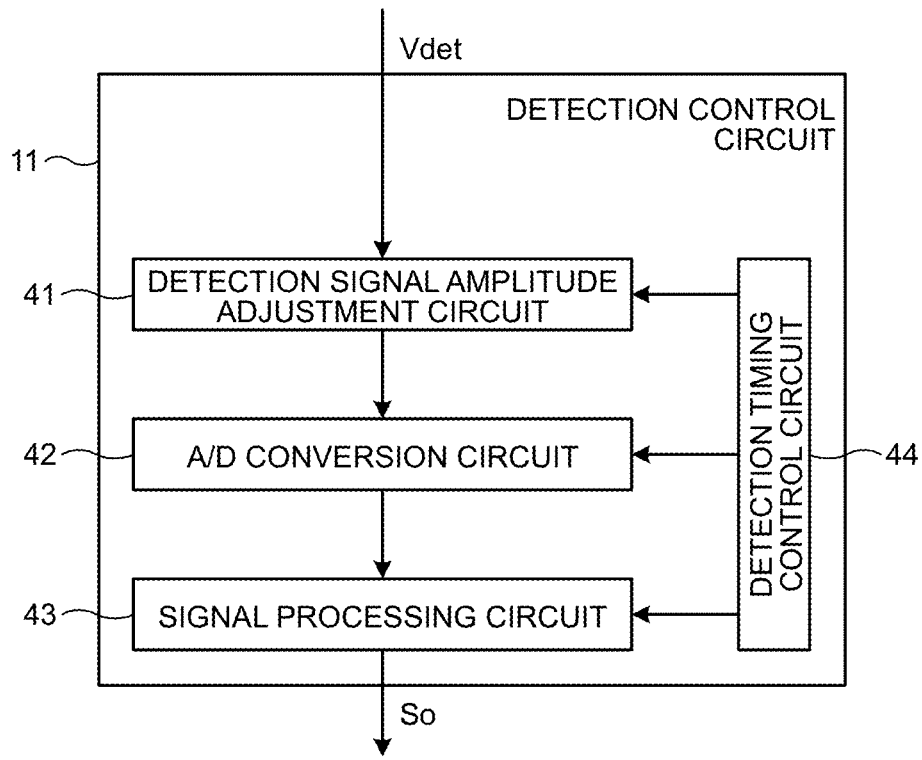
FIG. 3 is a block diagram illustrating a configuration example of a detection control circuit according to the embodiment.

FIG. 3 is a block diagram illustrating a configuration example of the detection control circuit according to the embodiment. As illustrated in FIG. 3, the detection control circuit 11 includes a detection signal amplitude adjustment circuit 41, an analog-to-digital (A/D) conversion circuit 42, a signal processing circuit 43, and a detection timing control circuit 44. In the detection control circuit 11, the detection timing control circuit 44 performs control to cause the detection signal amplitude adjustment circuit 41, the A/D conversion circuit 42, and the signal processing circuit 43 to operate in synchronization with one another based on a control signal supplied from the host IC 70 (refer to FIG. 2).

The detection signal amplitude adjustment circuit 41 is a circuit that adjusts the amplitude of the detection signal Vdet output from the photodiode 30 and is configured with an amplifier, for example. The A/D conversion circuit 42 converts analog signals output from the detection signal amplitude adjustment circuit 41 into digital signals. The signal processing circuit 43 is a circuit that performs signal processing of the digital signals from the A/D conversion circuit 42 and transmits the sensor values So to the host IC 70.

Referring back to FIG. 2, the light source device 80 includes the light source substrate 81, the light-emitting elements 82 formed on the light source substrate 81, gate line drive circuits 15C and 15D, a signal line drive circuit 16B, and a light-emitting element control circuit 12.

The light-emitting elements 82 are arranged in a matrix having a row-column configuration in an area overlapping the detection area AA of the light source substrate 81. The light source substrate 81 is a drive circuit board for driving each of the light-emitting elements 82 to be switched between on (in a lit-up state) and off (in a non-lit state).

The light-emitting element control circuit 12 is a circuit that supplies control signals Sd, Se, and Sf to the gate line drive circuits 15C and 15D, and the signal line drive circuit 16B, respectively, to control operations of these circuits.

Specifically, the gate line drive circuits 15C and 15D output drive signals to gate lines (not illustrated) based on the control signals Sd and Se, and thus select the light-emitting elements 82 in a given row. The signal line drive circuit 16B supplies a light-emitting element control signal to a selected signal line (not illustrated) based on the control signal Sf. Thus, the light source device 80 can light up the different light-emitting elements 82 at different light amounts. The light source device 80 can also switch each of the light-emitting elements 82 between the lit-up state (on) and the non-lit state (off).

The light source substrate 81 of the light source device 80 is what is called an active matrix substrate, but is not limited thereto. Any method may be used to control on and off the light-emitting elements 82. For example, the light-emitting element control circuit 12 may individually control each of the light-emitting elements 82.

The host IC 70 controls the optical sensor 10 and the light source device 80 to execute a light amount setting mode to set light amounts of the light-emitting elements 82 for detection and a detection mode to detect the object to be detected 100. In the light amount setting mode, the host IC 70 lights up the light-emitting elements 82 at different light amounts, and the photodiodes 30 output the sensor values So corresponding to the different light amounts. The host IC 70 then compares the detected sensor values So with a preset target sensor value So-t and sets the light amounts of the light-emitting elements 82 for detection. In the detection mode, the host IC 70 lights up the light-emitting elements 82 at the set light amounts for detection, and the photodiodes 30 output the sensor values So corresponding to the set light amounts for detection.

The host IC 70 includes a sensor value storage circuit 71, a sensor value calculation circuit 72, a light amount setting circuit 73, and a target value storage circuit 79 as control circuits for the optical sensor 10. The sensor value storage circuit 71 stores therein the sensor values So output from the detection control circuit 11 of the optical sensor 10. The sensor value calculation circuit 72 performs a predetermined calculation process on the sensor values So of the photodiodes 30. For example, the sensor value calculation circuit 72 calculates the average value of the sensor values So from the photodiodes 30 corresponding to one of the light-emitting elements 82.

In the light amount setting mode, the light amount setting circuit 73 compares each of the sensor values So detected by the photodiodes 30 with the preset target sensor value So-t acquired from the target value storage circuit 79 and sets the light amounts of the light-emitting elements 82 for detection. The target value storage circuit 79 stores therein the preset target sensor value So-t. A method for setting the light amounts of the light-emitting elements 82 for detection by the light amount setting circuit 73 and the details of the target sensor value So-t stored in the target value storage circuit 79 will be described with reference to FIG. 7 and subsequent drawings.

The host IC 70 includes a lighting pattern generation circuit 74 and a lighting pattern storage circuit 75 as control circuits for the light source device 80. The lighting pattern storage circuit 75 stores therein information on a light amount of each of the light-emitting elements 82 in the light amount setting mode. The lighting pattern storage circuit 75 also stores therein the information on the light amount of each of the light-emitting elements 82 in the detection mode based on the information on the light amounts for detection acquired from the light amount setting circuit 73. The lighting pattern storage circuit 75 stores therein an arrangement pattern of on (lit-up state) and off (non-lit state) of the light-emitting elements 82 as needed.

The lighting pattern generation circuit 74 generates various control signals based on the information on the light amounts in the lighting pattern storage circuit 75. The lighting pattern generation circuit 74 then outputs, to the light-emitting element control circuit 12, the light-emitting element control signals including the information on the light amounts of the light-emitting elements 82 in each of the light amount setting mode and the detection mode.

The host IC 70 further includes an image generation circuit 76. In the detection mode, the image generation circuit 76 generates an image of the objects to be detected 100 based on the sensor values So output from the photodiodes 30. The sensor values So used by the image generation circuit 76 are output from the photodiodes 30 correspondingly to the light amounts for detection set in the light amount setting mode.

Although not illustrated, the host IC 70 includes a control circuit that synchronously controls the detection control circuit 11 and the light-emitting element control circuit 12. That is, the switching of the light amounts of the light-emitting elements 82 of the light source device 80 and the detection of the photodiodes 30 of the optical sensor 10 are synchronously controlled based on a control signal from the host IC 70. The optical sensor 10 includes the two gate line drive circuits 15A and 15B, but may include one gate line drive circuit. The light source device 80 includes the two gate line drive circuits 15C and 15D, but may include one gate line drive circuit.

Figure 4:
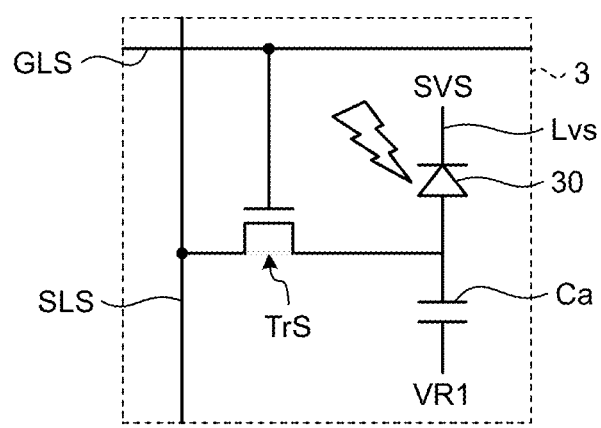
FIG. 4 is a circuit diagram illustrating a sensor pixel.

The following describes a configuration example of the optical sensor 10. FIG. 4 is a circuit diagram illustrating the sensor pixel. As illustrated in FIG. 4, the sensor pixel 3 includes the photodiode 30, a capacitive element Ca, and a first transistor TrS. The first transistor TrS is provided correspondingly to the photodiode 30. The first transistor TrS is formed of a thin-film transistor, and in this example, formed of an n-channel metal oxide semiconductor (MOS) thin-film transistor (TFT). The gate of the first transistor TrS is coupled to the sensor gate line GLS. The source of the first transistor TrS is coupled to the sensor signal line SLS. The drain of the first transistor TrS is coupled to the anode of the photodiode 30 and the capacitive element Ca.

The cathode of the photodiode 30 is supplied with a power supply potential SVS from the detection control circuit 11. The capacitive element Ca is supplied with a reference potential VR1 serving as an initial potential of the capacitive element Ca from the detection control circuit 11.

When the sensor pixel 3 is irradiated with light, a current corresponding to the amount of the light flows through the photodiode 30. As a result, an electric charge is stored in the capacitive element Ca. After the first transistor TrS is turned on, a current corresponding to the electric charge stored in the capacitive element Ca flows through the sensor signal line SLS. The sensor signal line SLS is coupled to the detection control circuit 11 through the signal line drive circuit 16A. Thus, the optical sensor 10 of the detection device 1 can detect a signal corresponding to the amount of the light received by the photodiode 30 for each of the sensor pixels 3.

The first transistor TrS is not limited to the n-type TFT, and may be configured as a p-type TFT. The pixel circuit of the sensor pixel 3 illustrated in FIG. 4 is merely exemplary. The sensor pixel 3 may be provided with a plurality of transistors corresponding to one photodiode 30.

Figure 5:
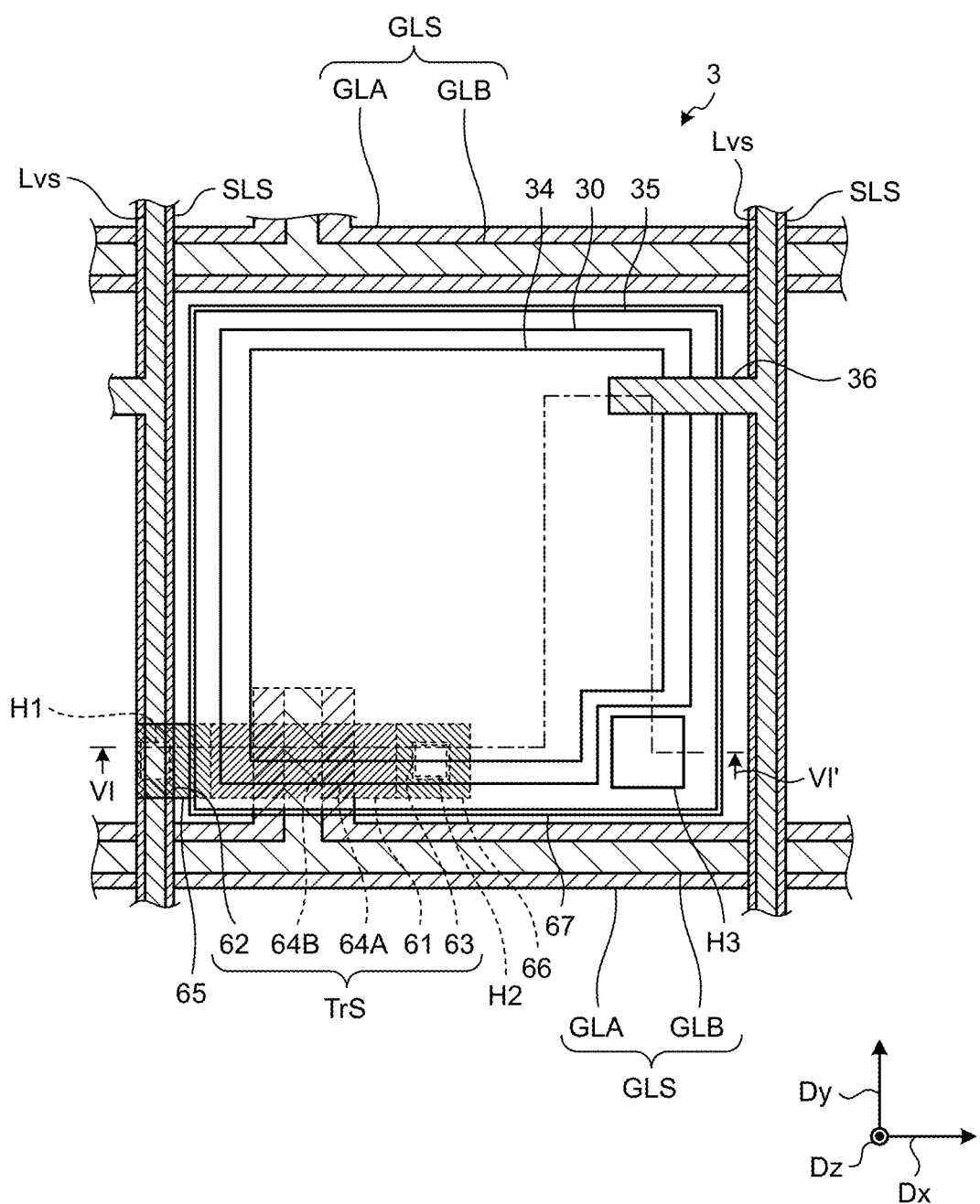
FIG. 5 is a plan view schematically illustrating the sensor pixel according to the embodiment.

The following describes a detailed configuration of the optical sensor 10. FIG. 5 is a plan view schematically illustrating the sensor pixel according to the embodiment.

In the following description, a first direction Dx is one direction in a plane parallel to the substrate 21 (refer to FIG. 6). A second direction Dy is one direction in the plane parallel to the substrate 21 and is a direction orthogonal to the first direction Dx. The second direction Dy may non-orthogonally intersect the first direction Dx. A third direction Dz is a direction orthogonal to the first direction Dx and the second direction Dy and is a direction normal to the principle surface of the substrate 21. The term "plan view" refers to a positional relation when viewed in a direction orthogonal to the substrate 21.

As illustrated in FIG. 5, the sensor pixel 3 is an area surrounded by the sensor gate lines GLS and the sensor signal lines SLS. In the present embodiment, the sensor gate line GLS includes a first sensor gate line GLA and a second sensor gate line GLB. The first sensor gate line GLA is provides so as to overlap the second sensor gate line GLB. The first and the second sensor gate lines GLA and GLB are provided in different layers with insulating layers 22c and 22d interposed therebetween (refer to FIG. 6). The first and the second sensor gate lines GLA and GLB are electrically coupled together at any point and are supplied with the gate drive signals having the same potential. At least one of the first gate line GLA and the second sensor gate line GLB is coupled to the gate line drive circuits 15A and 15B. In FIG. 5, the first and the second sensor gate lines GLA and GLB have different widths but may have the same width.

The photodiode 30 is provided in the area surrounded by the sensor gate lines GLS and the sensor signal lines SLS. An upper electrode 34 and a lower electrode 35 are provided for each of the photodiodes 30. The photodiode 30 is a PIN photodiode, for example. The lower electrode 35 is, for example, an anode electrode of the photodiode 30. The upper electrode 34 is, for example, a cathode electrode of the photodiode 30.

The upper electrode 34 is coupled to a power supply signal line Lvs through coupling wiring 36. The power supply signal line Lvs is wiring that supplies the power supply potential SVS to the photodiode 30. In the present embodiment, the power supply signal line Lvs extends in the second direction Dy while overlapping the sensor signal line SLS. The sensor pixels 3 arranged in the second direction Dy are coupled to the power supply signal line Lvs that is shared by those sensor pixels 3. Such a configuration can enlarge an opening for the sensor pixel 3. The lower electrode 35, the photodiode 30, and the upper electrode 34 are substantially quadrilateral in plan view. However, the shapes of the lower electrode 35, the photodiode 30, and the upper electrode 34 are not limited thereto and can be changed as appropriate.

The first transistor TrS is provided near an intersection between the sensor gate line GLS and the sensor signal line SLS. The first transistor TrS includes a semiconductor layer 61, a source electrode 62, a drain electrode 63, a first gate electrode 64A, and a second gate electrode 64B.

The semiconductor layer 61 is an oxide semiconductor. The semiconductor layer 61 is more preferably a transparent amorphous oxide semiconductor (TAOS) among various oxide semiconductors. Using an oxide semiconductor as the first transistor TrS can reduce a leakage current of the first transistor TrS. That is, the first transistor TrS can reduce the leakage current from a non-selected one of the sensor pixels 3. Therefore, the optical sensor 10 can improve the signal-to-noise ratio (S/N). The semiconductor layer 61 is, however, not limited thereto, and may be formed of, for example, a microcrystalline oxide semiconductor, an amorphous oxide semiconductor, polysilicon, or low-temperature polycrystalline silicon (LTPS).

The semiconductor layer 61 is provided along the first direction Dx and intersects the first and the second gate electrodes 64A and 64B in plan view. The first and the second gate electrodes 64A and 64B are provided so as to branch from the first and the second sensor gate lines GLA and GLB, respectively. In other words, portions of the first and the second sensor gate lines GLA and GLB that overlap the semiconductor layer 61 serve as the first and the second gate electrodes 64A and 64B. Aluminum (Al), copper (Cu), silver (Ag), molybdenum (Mo), or an alloy of these metals is used as the first and the second gate electrodes 64A and 64B. Channel regions are formed at portions of the semiconductor layer 61 that overlap the first and the second gate electrodes 64A and 64B.

One end of the semiconductor layer 61 is coupled to the source electrode 62 through a contact hole H1. The other end of the semiconductor layer 61 is coupled to the drain electrode 63 through a contact hole H2. A portion of the sensor signal line SLS that overlaps the semiconductor layer 61 serves as the source electrode 62. A portion of a third conductive layer 67 that overlaps the semiconductor layer 61 serves as the drain electrode 63. The third conductive layer 67 is coupled to the lower electrode 35 through a contact hole H3. Such a configuration allows the first transistor TrS to switch between coupling and decoupling between the photodiode 30 and the sensor signal line SLS.

The following describes a layer configuration of the optical sensor 10. FIG. 6 is a sectional view along VI-VI' of FIG. 5.

In the description of the detection device 1 that includes the optical sensor 10, a direction from the substrate 21 toward the photodiode 30 in a direction (third direction Dz) orthogonal to a surface of the substrate 21 is referred to as "upward" or "above". A direction from the photodiode 30 toward the substrate 21 is referred to as "downward" or "below".

Figure 6:
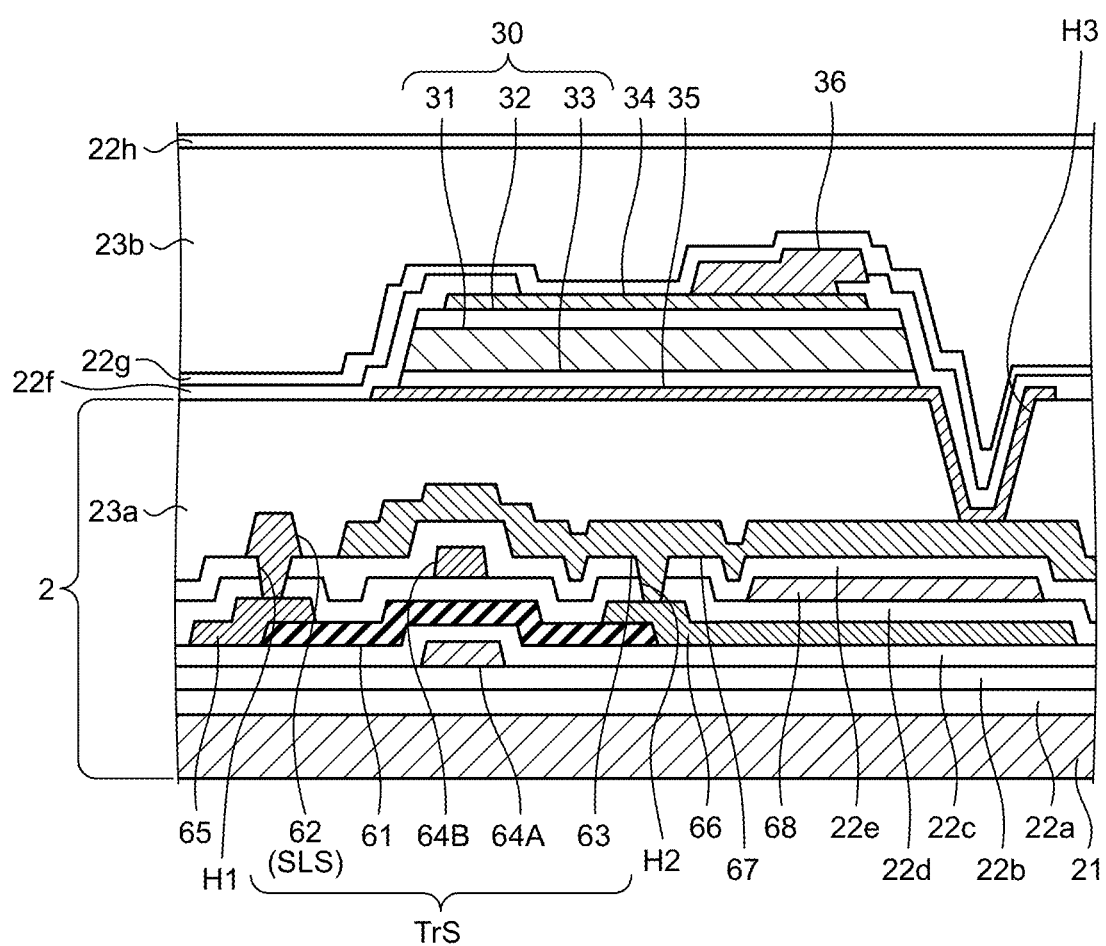
FIG. 6 is a sectional view along VI-VI' of FIG. 5.

As illustrated in FIG. 6, the substrate 21 is an insulating substrate and is made using, for example, a glass substrate of quartz, alkali-free glass, or the like. The first transistor TrS, various types of wiring (the sensor gate line GLS and the sensor signal line SLS), and insulating layers are provided to form the array substrate 2 on one surface side of the substrate 21. The photodiodes 30 are arranged on the upper side of the array substrate 2, that is, on the one surface side of the substrate 21. The substrate 21 may be a resin substrate or a resin film made of a resin such as polyimide.

Insulating layers 22a and 22b are provided on the substrate 21. Insulating layers 22a, 22b, 22c, 22d, 22e, 22f, and 22g are inorganic insulating films and are formed of a silicon oxide ($SiO_2$) or a silicon nitride (SiN). Each of the inorganic insulating layers is not limited to a single layer and may be a multilayered film.

The first gate electrode 64A is provided above the insulating layer 22b. The insulating layer 22c is provided on the insulating layer 22b so as to cover the first gate electrode 64A. The semiconductor layer 61, a first conductive layer 65, and a second conductive layer 66 are provided on the insulating layer 22c. The first conductive layer 65 is provided so as to cover an end of the semiconductor layer 61 coupled to the source electrode 62. The second conductive layer 66 is provided so as to cover an end of the semiconductor layer 61 coupled to the drain electrode 63.

The insulating layer 22d is provided on the insulating layer 22c so as to cover the semiconductor layer 61, the first conductive layer 65, and the second conductive layer 66. The second gate electrode 64B is provided on the insulating layer 22d. The semiconductor layer 61 is provided between the first gate electrode 64A and the second gate electrode 64B in the direction orthogonal to the substrate 21. That is, the first transistor TrS has what is called a dual-gate structure. The first transistor TrS may, however, have a bottom-gate structure that is provided with the first gate electrode 64A and not provided with the second gate electrode 64B, or a top-gate structure that is not provided with the first gate electrode 64A and provided with only the second gate electrode 64B.

The insulating layer 22e is provided on the insulating layer 22d so as to cover the second gate electrode 64B. The source electrode 62 (sensor signal line SLS) and the drain electrode 63 (third conductive layer 67) are provided on the insulating layer 22e. In the present embodiment, the drain electrode 63 is the third conductive layer 67 provided above the semiconductor layer 61 with the insulating layers 22d and 22e interposed therebetween. The source electrode 62 is electrically coupled to the semiconductor layer 61 through the contact hole H1 and the first conductive layer 65. The drain electrode 63 is electrically coupled to the semiconductor layer 61 through the contact hole H2 and the second conductive layer 66.

The third conductive layer 67 is provided in an area overlapping the photodiode 30 in plan view. The third conductive layer 67 is provided also on the upper side of the semiconductor layer 61 and the first and the second gate electrodes 64A and 64B. That is, the third conductive layer 67 is provided between the second gate electrode 64B and the lower electrode 35 in the direction orthogonal to the substrate 21. With this configuration, the third conductive layer 67 has a function as a protective layer that protects the first transistor TrS.

The second conductive layer 66 extends so as to face the third conductive layer 67 in an area not overlapping the semiconductor layer 61. A fourth conductive layer 68 is provided on the insulating layer 22d in the area not overlapping the semiconductor layer 61. The fourth conductive layer 68 is provided between the second conductive layer 66 and the third conductive layer 67. This configuration generates capacitance between the second conductive layer 66 and the fourth conductive layer 68, and capacitance between the third conductive layer 67 and the fourth conductive layer 68. The capacitance generated by the second conductive layer 66, the third conductive layer 67, and the fourth conductive layer 68 serves as capacitance of the capacitive element Ca illustrated in FIG. 4.

A first organic insulating layer 23a is provided on the insulating layer 22e so as to cover the source electrode 62 (sensor signal line SLS) and the drain electrode 63 (third conductive layer 67). The first organic insulating layer 23a is a planarizing layer that planarizes asperities formed by the first transistor TrS and various conductive layers.

The following describes a sectional configuration of the photodiode 30. The photodiode 30 is stacked on the first organic insulating layer 23a of the array substrate 2 in the order of the lower electrode 35, the photodiode 30, and the upper electrode 34.

The lower electrode 35 is provided on the first organic insulating layer 23a and is electrically coupled to the third conductive layer 67 through the contact hole H3. The lower electrode 35 is the anode of the photodiode 30 and is an electrode for reading the detection signal Vdet. For example, a metal material such as molybdenum (Mo) or aluminum (Al) is used as the lower electrode 35. The lower electrode 35 may alternatively be a multilayered film formed of a plurality of layers of these metal materials. The lower electrode 35 may be formed of a light-transmitting conductive material such as indium tin oxide (ITO) or indium zinc oxide (IZO).

The photodiode 30 includes an i-type semiconductor layer 31, an n-type semiconductor layer 32, and a p-type semiconductor layer 33 as semiconductor layers. The i-type semiconductor layer 31, the n-type semiconductor layer 32, and the p-type semiconductor layer 33 are formed of amorphous silicon (a-Si), for example. In FIG. 6, the p-type semiconductor layer 33, the i-type semiconductor layer 31, and the n-type semiconductor layer 32 are stacked in this order in the direction orthogonal to the surface of the substrate 21. However, the photodiode 30 may have a reversed configuration. That is, the n-type semiconductor layer 32, the i-type semiconductor layer 31, and the p-type semiconductor layer 33 may be stacked in this order. Each of the semiconductor layers may be a photoelectric conversion element formed of an organic semiconductor.

The a-Si of the n-type semiconductor layer 32 is doped with impurities to form an n+ region. The a-Si of the p-type semiconductor layer 33 is doped with impurities to form a p+ region. The i-type semiconductor layer 31 is, for example, a non-doped intrinsic semiconductor, and has lower conductivity than that of the n-type semiconductor layer 32 and the p-type semiconductor layer 33.

The upper electrode 34 is the cathode of the photodiode 30 and is an electrode for supplying the power supply potential SVS to the photoelectric conversion layers. The upper electrode 34 is, for example, a light-transmitting conductive layer of, for example, ITO, and a plurality of the upper electrodes 34 are provided for the respective photodiodes 30.

The insulating layers 22f and 22g are provided on the first organic insulating layer 23a. The insulating layer 22f covers the periphery of the upper electrode 34 and is provided with an opening in a position overlapping the upper electrode 34. The coupling wiring 36 is coupled to a portion of the upper electrode 34 not provided with the insulating layer 22f. The insulating layer 22g is provided on the insulating layer 22f so as to cover the upper electrode 34 and the coupling wiring 36. A second organic insulating layer 23b serving as a planarizing layer is provided on the insulating layer 22g. If the photodiode 30 is made of organic semiconductors, an insulating layer 22h may be further provided on the upper side thereof.

Figure 7:
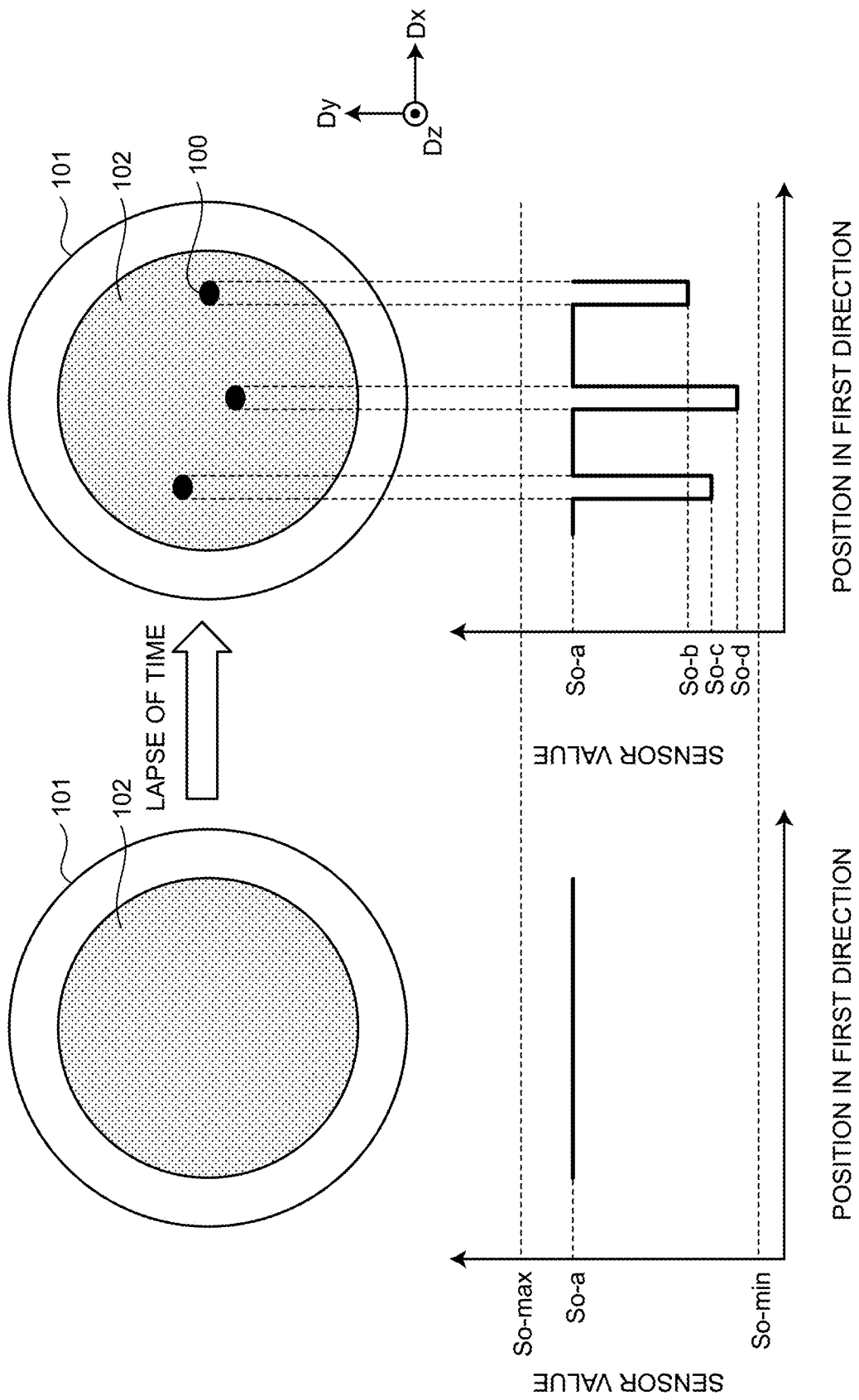
FIG. 7 illustrates explanatory diagrams for schematically explaining a relation of objects to be detected, a placement substrate, and a culture medium with sensor values.
Figure 8:
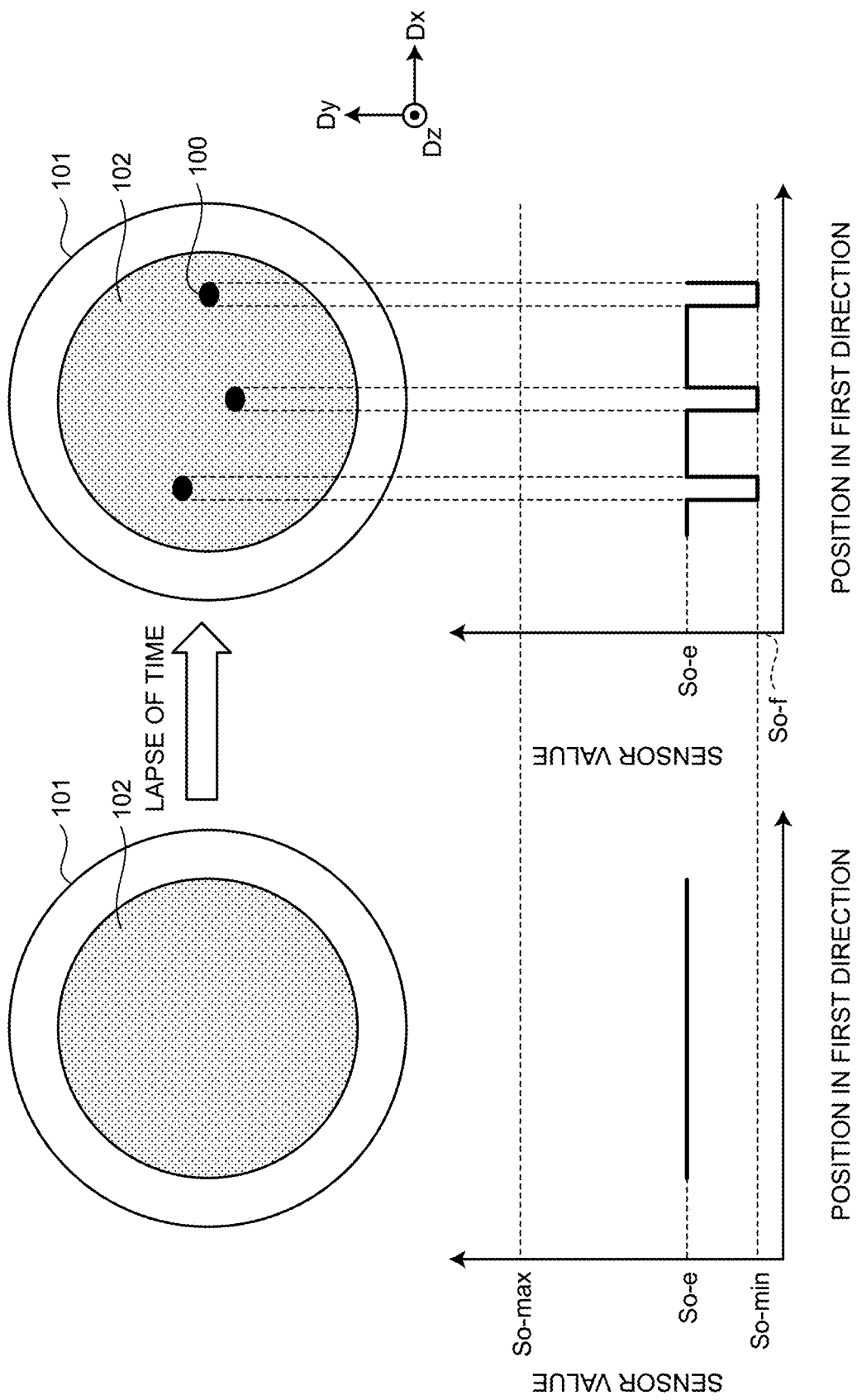
FIG. 8 illustrates explanatory diagrams for schematically explaining the relation of the objects to be detected, the placement substrate, and the culture medium with the sensor values in a detection device according to a comparative example.

The following describes one example of a detection method of the detection device 1 according to the present embodiment. FIG. 7 illustrates explanatory diagrams for schematically explaining a relation of the objects to be detected, the placement substrate, and the culture medium with the sensor values. FIG. 8 illustrates explanatory diagrams for schematically explaining the relation of the objects to be detected, the placement substrate, and the culture medium with the sensor values in a detection device according to a comparative example.

A maximum sensor value So-max illustrated in FIGS. 7 and 8 is the sensor value So corresponding to the upper limit value of a detection range of the detection control circuit 11 (refer to FIG. 3). A minimum sensor value So-min is the sensor value So corresponding to the lower limit value of the detection range of the detection control circuit 11. The detection range of the detection control circuit 11 is a detection range in which an electric charge (sensor value So) output from the photodiode 30 are detectable.

As illustrated in the left diagrams of FIG. 7, in an initial state where no object to be detected 100 is present in the culture medium 102, the light L emitted from the light-emitting elements 82 enters the photodiode 30 through the culture medium 102 and the placement substrate 101. The photodiode 30 outputs a sensor value So-a corresponding to the amount of light emitted thereto. In the initial state, the sensor value So-a is between the minimum sensor value So-min and the maximum sensor value So-max.

As illustrated in the right diagrams of FIG. 7, after a predetermined time elapses from the initial state, the objects to be detected 100 (such as bacteria) have grown in the culture medium 102. The amounts of light incident on the photodiodes 30 vary depending on the turbidity (light transmittance) of the culture medium 102 and/or the presence or absence of the objects to be detected 100. The amounts of light incident on the photodiodes 30 are smaller in areas overlapping the objects to be detected 100 than in areas not overlapping the objects to be detected 100. The photodiodes 30 corresponding to positions of the objects to be detected 100 output sensor values So-b, So-c, and So-d. The sensor values So-b, So-c, and So-d corresponding to the objects to be detected 100 are smaller than the sensor value So-a in the initial state and are between the minimum sensor value So-min and the maximum sensor value So-max.

As illustrated in the left diagrams of FIG. 8, in the detection device according to the comparative example, the amounts of light L emitted from the light-emitting elements 82 are smaller than in the detection device according to the embodiment illustrated in FIG. 7. In this case, in the initial state, a sensor value So-e output from the photodiode 30 is between the minimum sensor value So-min and the maximum sensor value So-max and is smaller than the sensor value So-a illustrated in FIG. 7.

As illustrated in the right diagrams of FIG. 8, in the detection device according to the comparative example, after a predetermined time elapses from the initial state, the amounts of light incident on the photodiodes 30 are smaller in areas overlapping the objects to be detected 100 than in areas not overlapping the objects to be detected 100. The sensor values So from the photodiodes 30 in positions corresponding to the objects to be detected 100 are smaller than the lower limit value of the detection range of the detection control circuit 11. As a result, a sensor value So-f that has been output from the photodiodes 30 in the positions corresponding to the objects to be detected 100 and has undergone the signal processing by the detection control circuit 11 is equal to the minimum sensor value So-min.

Thus, even if the amounts of the light L emitted from the light-emitting elements 82 are within a detectable range in the initial state, the objects to be detected 100 may not be accurately detectable depending on the state of the objects to be detected 100, the culture medium 102, and the like. In other words, even if the state of the objects to be detected 100, the culture medium 102, and the like has changed, the amounts of the light L emitted from the light-emitting elements 82 need to be appropriately set so that the sensor values So-b, So-c, and So-d are between the minimum sensor value So-min and the maximum sensor value So-max, as illustrated in FIG. 7.

The following describes the method for setting the amounts of the light L emitted from the light-emitting elements 82 in the detection mode to detect the objects to be detected 100 (hereinafter, referred to as "light amounts for detection"), with reference to FIGS. 9 to 14.

Figure 9:
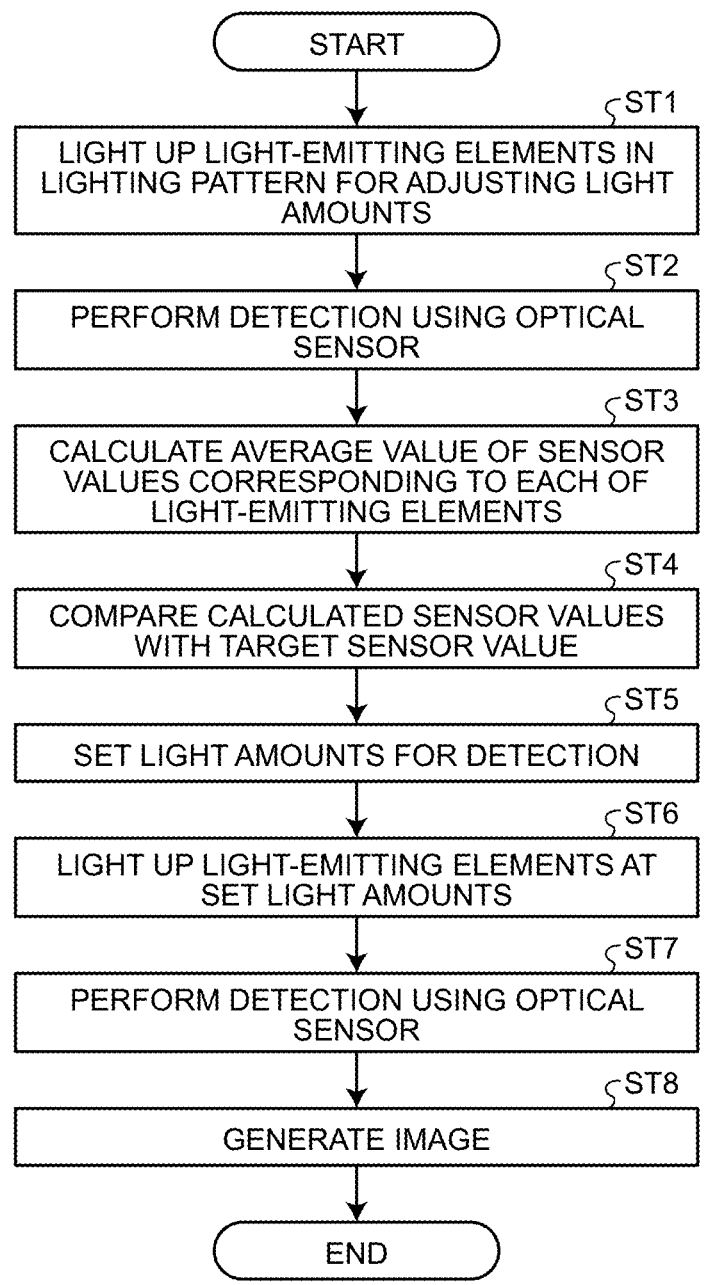
FIG. 9 is a flowchart illustrating a light amount setting mode and a detection mode of the detection device according to the embodiment.

FIG. 9 is a flowchart illustrating the light amount setting mode and the detection mode of the detection device according to the embodiment. As illustrated in FIG. 9, the detection device 1 according to the embodiment includes the light amount setting mode (from Step ST1 to Step ST5) and the detection mode (from Step ST6 to Step ST8).

At the start of measurement of the optical sensor 10, the host IC 70 executes the light amount setting mode in the initial state illustrated in FIG. 7. The host IC 70 supplies control signals to the light source device 80 to light up the light-emitting elements 82 in a lighting pattern for adjusting the light amounts (Step ST1).

Figure 10:
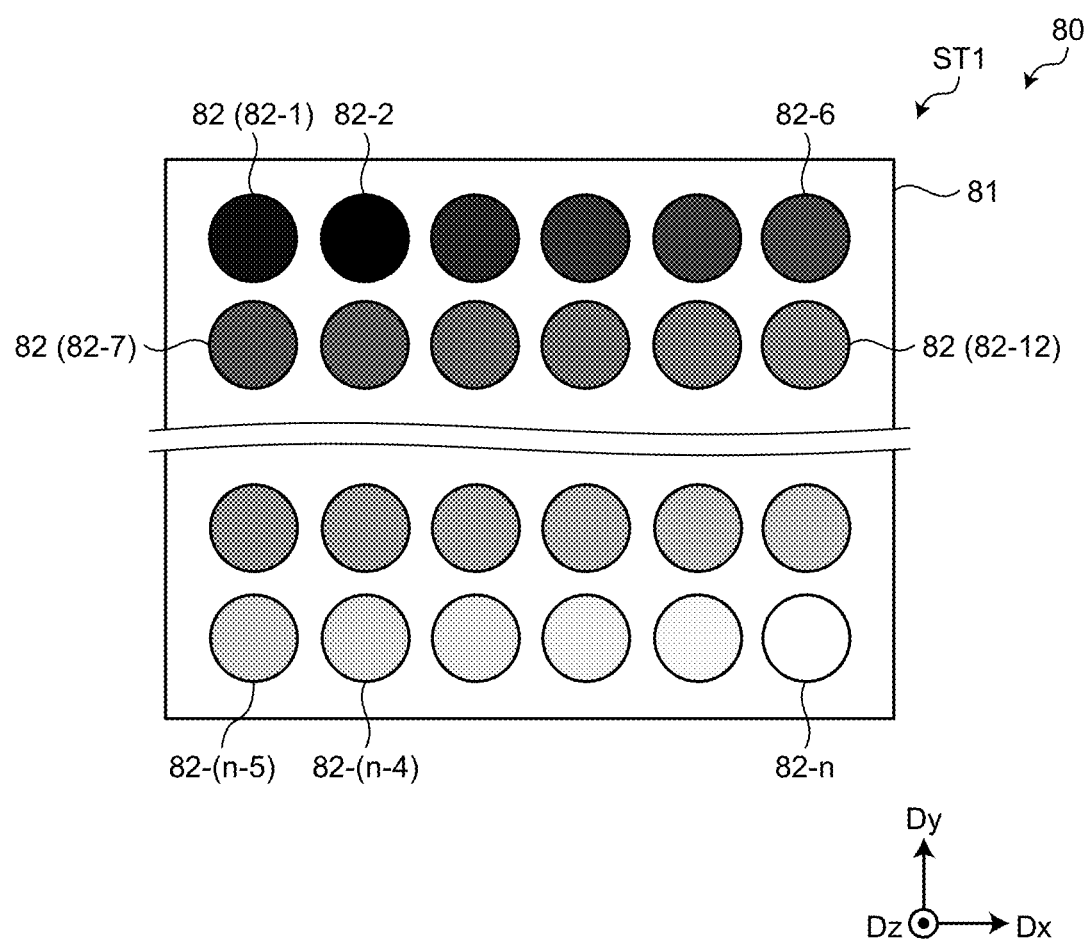
FIG. 10 is an explanatory view schematically illustrating a lighting pattern for adjusting light amounts of a plurality of light-emitting elements of the detection device according to the embodiment.

FIG. 10 is an explanatory view schematically illustrating the lighting pattern for adjusting the light amounts of the light-emitting elements of the detection device according to the embodiment. As illustrated in FIG. 10, the light-emitting elements 82 are arranged in a matrix having a row-column configuration on the light source substrate 81. In the lighting pattern for adjusting the light amounts, the light-emitting elements 82 are lit up at different light amounts. The light amount of a light-emitting element 82-1 located at the upper left in FIG. 10 is smallest, and the light amount increases in the order of light-emitting elements 82-1, 82-2, ..., 82-6 arranged in the first row. The light amounts of light-emitting elements 82-7 to 82-12 arranged in the second row are larger than those of the light-emitting elements 82 in the first row. The light amounts of light-emitting elements 82-13 to 82-18 arranged in the third row are larger than those of the light-emitting elements 82 in the second row. Thus, the light amounts of the light-emitting elements 82 arranged in a matrix having a row-column configuration sequentially differ, and the light amount increases as a light-emitting element number of the light-emitting element 82 increases. The light-emitting element number is a number given to each light-emitting element 82 and ranges from 1 to n. Among the light-emitting elements 82 in the last row, the light-emitting element 82-$n$ in the last row located at the lower right of FIG. 10 emits the largest amount of light.

The lighting pattern for adjusting the light amounts of the light-emitting elements 82 is stored in advance in the lighting pattern storage circuit 75 (refer to FIG. 2). The lighting pattern generation circuit 74 receives the information on the lighting pattern for adjusting the light amounts from the lighting pattern storage circuit 75, generates the light-emitting element control signal corresponding to the light amount of each of the light-emitting elements 82, and outputs the result to the light source device 80.

The number, the arrangement pitch, and the lighting pattern for adjusting the light amounts of the light-emitting elements 82 illustrated in FIG. 10 are merely exemplary and can be changed as appropriate.

The host IC 70 then performs detection using the optical sensor 10 (Step ST2). Specifically, the light L from the light-emitting elements 82 lit up at the different light amounts enters the photodiodes 30 of the optical sensor 10 through the culture medium 102 in the initial state and the placement substrate 101. The photodiodes 30 output the sensor values So corresponding to the different light amounts.

Figure 11:
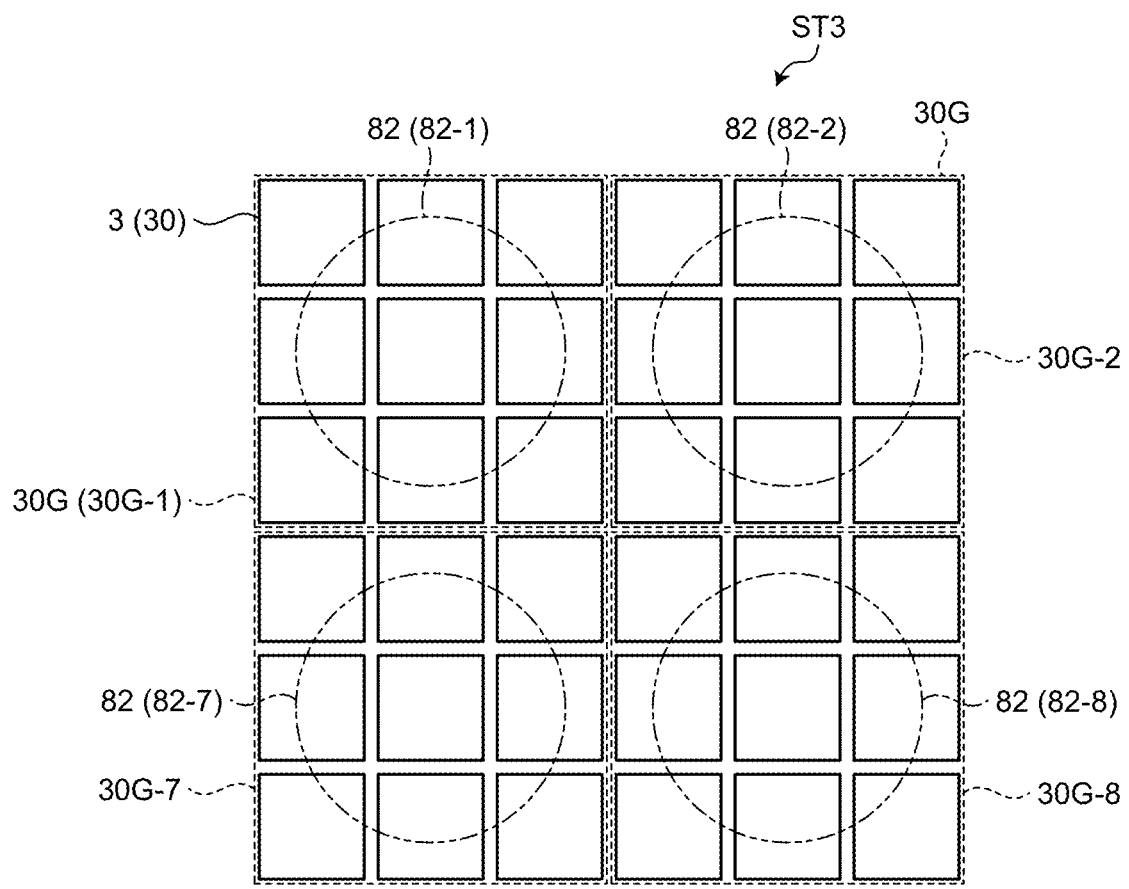
FIG. 11 is a plan view schematically illustrating an arrangement relation between a plurality of photodiodes and the light-emitting elements.

FIG. 11 is a plan view schematically illustrating an arrangement relation between the photodiodes and the light-emitting elements. As illustrated in FIG. 11, a plurality of the photodiodes 30 are provided in an area overlapping one of the light-emitting elements 82. Photodiode groups 30G-1, 30G-2, 30G-7, and 30G-8 are arranged for the light-emitting elements 82-1, 82-2, 82-7, and 82-8, respectively. In the example illustrated in FIG. 11, a photodiode group 30G including nine of the photodiodes 30 is disposed in an area overlapping one of the light-emitting elements 82.

FIG. 11 is merely exemplary. At least one of the photodiodes 30 only needs to be provided so as to overlap one of the light-emitting elements 82. The number of the photodiodes 30 included in the photodiode group 30G may be equal to or smaller than eight, or equal to or larger than 10.

The host IC 70 then receives the sensor values So from the optical sensor 10 and calculates the average value of the sensor values So corresponding to each of the light-emitting elements 82 (Step ST3). In the example illustrated in FIG. 11, the photodiode groups 30G-1, 30G-2, 30G-7, and 30G-8 are arranged correspondingly to the light-emitting elements 82-1, 82-2, 82-7, and 82-8, respectively, that are lit up at the different light amounts. The sensor value calculation circuit 72 calculates the average value of the sensor values So for each of the photodiode groups 30G-1, 30G-2, 30G-7, and 30G-8, that is, for each of the light-emitting elements 82 lit up at the different light amounts. For example, the sensor value calculation circuit 72 calculates the average value of the sensor values So output from the nine photodiodes 30 in the photodiode group 30G-1.

Figure 12:
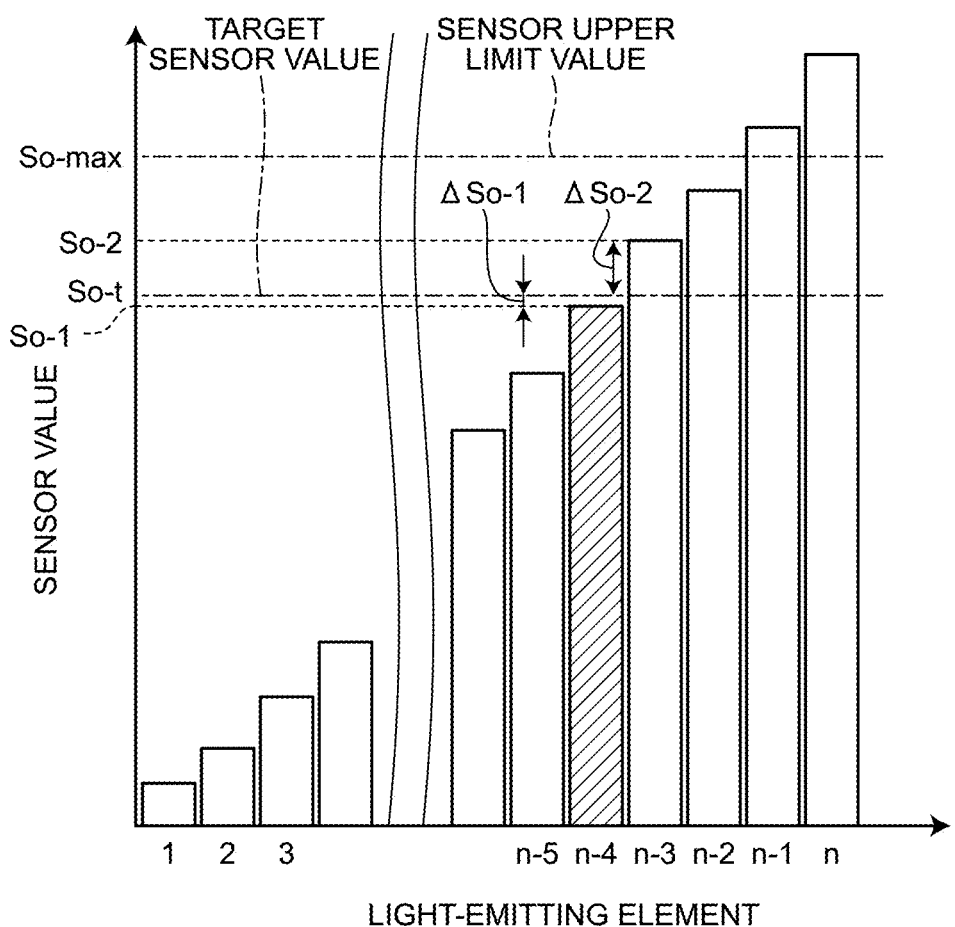
FIG. 12 is an explanatory graph for explaining relations of the light-emitting elements lit up at different light amounts with the sensor values of the photodiodes.

Then, the light amount setting circuit 73 of the host IC 70 (refer to FIG. 2) compares the calculated sensor values So with the target sensor value So-t. FIG. 12 is an explanatory graph for explaining relations of the light-emitting elements lit up at the different light amounts with the sensor values of the photodiodes. The sensor value So of each light-emitting element 82 in FIG. 12 is the average value of the sensor values So of the photodiodes 30 included in the photodiode group 30G described above.

The light amount setting circuit 73 (refer to FIG. 2) receives the sensor values So of the light-emitting elements 82 lit up at the different light amounts from the sensor value calculation circuit 72. The light amount setting circuit 73 also receives the preset target sensor value So-t from the target value storage circuit 79. The light amount setting circuit 73 then compares the sensor values So of the light-emitting elements 82 lit up at the different light amounts with the target sensor value So-t (Step ST4).

The target sensor value So-t is a value corresponding to the sensor value So-a in the initial state illustrated in FIG. 7 and is set in advance within a range from 90% to 100% with respect to the maximum sensor value So-max. Setting the target sensor value So-t to a value close to the maximum sensor value So-max allows the sensor values So-b, So-c, and So-d corresponding to the objects to be detected 100 to be maintained to a value equal to or larger than the minimum sensor value So-min after the lapse of the predetermined time.

As illustrated in FIG. 12, the sensor value So in the initial state increases as the light-emitting element number increases from the light-emitting element 82-1 to the light-emitting element 82-$n$, that is, as the light amount of the light-emitting element 82 increases. In the example illustrated in FIG. 12, a sensor value So-1 of the photodiodes 30 corresponding to a light-emitting element 82-($n$−4) among the light-emitting elements 82 is closest to the target sensor value So-t. A sensor value So-2 of the photodiodes 30 corresponding to a light-emitting element 82-($n$−3) is second closest to the target sensor value So-t. A difference ΔSo-1 between the sensor value So-1 and the target sensor value So-t is smaller than a difference ΔSo-2 between the sensor value So-2 and the target sensor value So-t.

Referring back to FIG. 9, the light amount setting circuit 73 (refer to FIG. 2) selects the sensor value So-1 (first sensor value) closest to the target sensor value So-t from among the sensor values So corresponding to the different light amounts. The light amount setting circuit 73 then sets the light amounts for detection to the light amount of the light-emitting element 82-($n$–4) corresponding to the sensor value So-1 (Step ST5). The set information on the light amounts for detection is stored in the lighting pattern storage circuit 75.

Then, the host IC 70 executes the detection mode based on the set light amounts for detection. In the detection mode, the light source device 80 lights up the light-emitting elements 82 at the set light amounts for detection (Step ST6). The lighting pattern generation circuit 74 receives the information on the light amounts for detection from the lighting pattern storage circuit 75, generates, for the light-emitting elements 82, the light-emitting element control signals corresponding to the light amounts for detection, and outputs the signals to the light source device 80. Thus, in the detection mode, the light-emitting elements 82 are simultaneously lit up at the light amounts for detection.

The optical sensor 10 performs the detection of the photodiodes 30 (Step ST7). The gate line drive circuit 15B of the optical sensor 10 sequentially scans from a sensor gate line GLS-1 in the first row to a sensor gate line GLS-m in the last row based on control signals from the host IC 70. Thus, the optical sensor 10 scans the photodiodes 30 in the entire detection area AA.

The photodiodes 30 output the sensor values So corresponding to the light L at the set light amounts for detection. In more detail, the light L from the light-emitting elements 82 lit up at the light amounts for detection is applied to the culture medium 102 and the objects to be detected 100. The light with amounts depending on the presence or absence of the objects to be detected 100 and/or the turbidity of the culture medium 102 enters the photodiodes 30. As a result, the photodiodes 30 output the sensor values So that vary depending on the presence or absence of the objects to be detected 100 and/or the turbidity of the culture medium 102.

The image generation circuit 76 (refer to FIG. 2) generates the image based on the sensor values So from the photodiodes 30 (Step ST8).

As described above, the detection device 1 of the present embodiment has the light amount setting mode and the detection mode. In the light amount setting mode, the light-emitting elements 82 are lit up at the different light amounts, and the photodiodes 30 output the sensor values So corresponding to the different light amounts. The host IC 70 compares the detected sensor values So with the preset target sensor value So-t, and sets the light amounts of the light-emitting elements 82 for detection.

Thus, the light amounts of the light-emitting elements 82 for detection are appropriately set so that the sensor value So in the initial state is close to the target sensor value So-t (from 90% to 100% of the maximum sensor value So-max). As a result, even if the state of the objects to be detected 100, the culture medium 102, and the like has changed over time, the sensor values So corresponding to the objects to be detected 100 (refer to the sensor values So-b, So-c, and So-d illustrated in FIG. 7) are between the minimum sensor value So-min and the maximum sensor value So-max. Therefore, the detection device 1 can improve the detection accuracy.

First Modification

Figure 13:
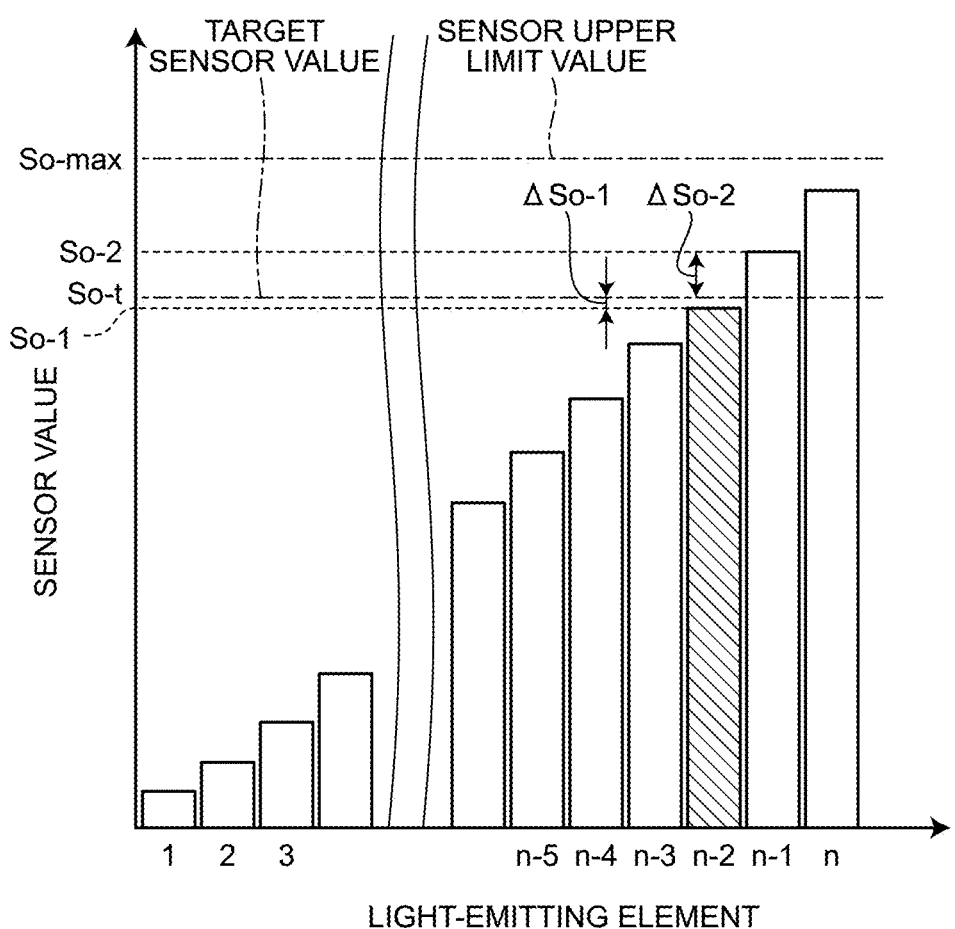
FIG. 13 is an explanatory diagram for explaining the relations of the light-emitting elements lit up at different light amounts with the sensor values of the photodiodes of the detection device according to a first modification of the embodiment.

FIG. 13 is an explanatory diagram for explaining the relations of the light-emitting elements lit up at the different light amounts with the sensor values of the photodiodes of the detection device according to a first modification of the embodiment. In the detection device 1 according to the first modification, the lighting pattern for adjusting the light amounts and the light amounts of the light-emitting elements 82 are the same as those in the example illustrated in FIG. 10. In the first modification, however, the turbidity of the culture medium 102 in the initial state (refer to FIG. 7) is higher than that in the embodiment described above. In other words, in the first modification, smaller light amounts enter the photodiodes 30 through the culture medium 102 in the initial state.

As illustrated in FIG. 13, in the first modification, the sensor values So of the photodiodes 30 corresponding to the light-emitting elements 82 are smaller than those of the example illustrated in FIG. 12. In the first modification, the sensor value So-1 of the photodiodes 30 corresponding to a light-emitting element 82-($n$–2) is closest to the target sensor value So-t among the light-emitting elements 82. The sensor value So-2 of the photodiodes 30 corresponding to a light-emitting element 82-($n$–1) is second closest to the target sensor value So-t.

In the first modification, the light amount setting circuit 73 sets the light amounts for detection to the light amount of the light-emitting element 82-($n$–2) corresponding to the sensor value So-1. The light amounts for detection set in the first modification are larger than the light amounts for detection set in the embodiment described above. In this manner, the detection device 1 according to the first modification can appropriately set the light amounts for detection in accordance with the state of the culture medium 102 and the like in the initial state.

Second Modification

Figure 14:
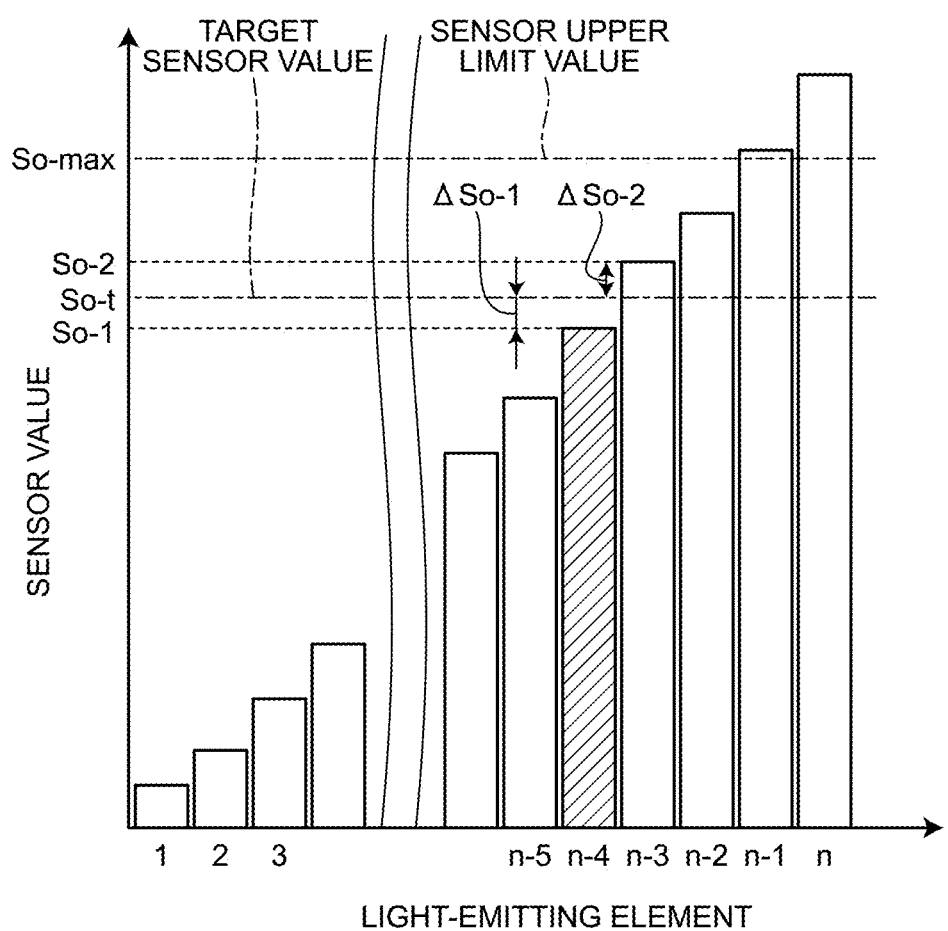
FIG. 14 is an explanatory diagram for explaining the relations of the light-emitting elements lit up at different light amounts with the sensor values of the photodiodes of the detection device according to a second modification of the embodiment.

FIG. 14 is an explanatory diagram for explaining the relations of the light-emitting elements lit up at the different light amounts with the sensor values of the photodiodes of the detection device according to a second modification of the embodiment. As illustrated in FIG. 14, in the second modification, the sensor value So-1 of the photodiodes 30 corresponding to the light-emitting element 82-($n$–4) and the sensor value So-2 of the photodiodes 30 corresponding to the light-emitting element 82-($n$–3) are closest to the target sensor value So-t among the light-emitting elements 82. The target sensor value So-t is a value between the sensor values So-1 and So-2. The difference ΔSo-1 between the sensor value So-1 and the target sensor value So-t is equal to the difference ΔSo-2 between the sensor value So-2 and the target sensor value So-t.

The light amount setting circuit 73 (refer to FIG. 2) selects the sensor value So-1 (first sensor value) and the sensor value So-2 (second sensor value) that are closest to the target sensor value So-t from among the sensor values So corresponding to the different light amounts. Then, in the case where the difference ΔSo-1 is equal to the difference ΔSo-2, the light amount setting circuit 73 sets the light amounts for detection to the average value of the light amount of the light-emitting element 82-($n$–4) (first light amount) corresponding to the sensor value So-1 and the light amount of the light-emitting element 82-($n$–3) (second light amount) corresponding to the sensor value So-2.

In this manner, the detection device 1 according to the second modification may select the two sensor values So-1 and So-2 that are closest to the target sensor value So-t, and set the light amounts for detection within a range from the first light amount corresponding to the sensor value So-1 to the second light amount corresponding to the sensor value So-2.

Third Modification

Figure 15:
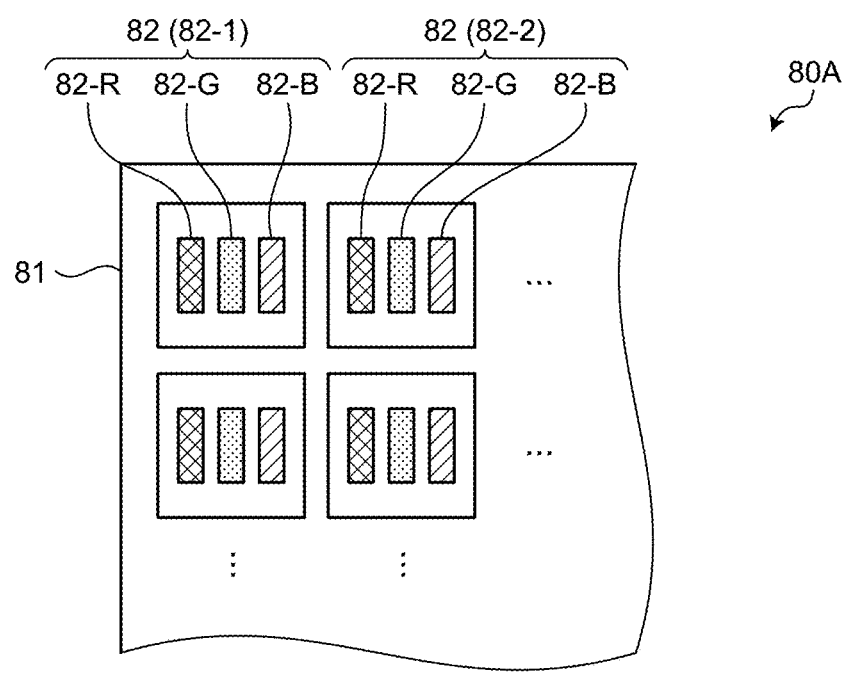
FIG. 15 is a plan view schematically illustrating a configuration example of the light-emitting elements of the detection device according to a third modification of the embodiment.

FIG. 15 is a plan view schematically illustrating a configuration example of the light-emitting elements of the detection device according to a third modification of the embodiment. As illustrated in FIG. 15, in a light source device 80A according to the third modification, the light-emitting elements 82 each include light-emitting elements 82-R, 82-G, and 82-B. The light-emitting element 82-R emits red light. The light-emitting element 82-G emits green light. The light-emitting element 82-B emits blue light. The light-emitting elements 82-R, 82-G, and 82-B are arranged so as to be lined up in this order. The arrangement of the light-emitting elements 82-R, 82-G, and 82-B is not limited to this arrangement, and can be changed as appropriate. The light-emitting elements 82 may have four or more colors.

Figure 16:
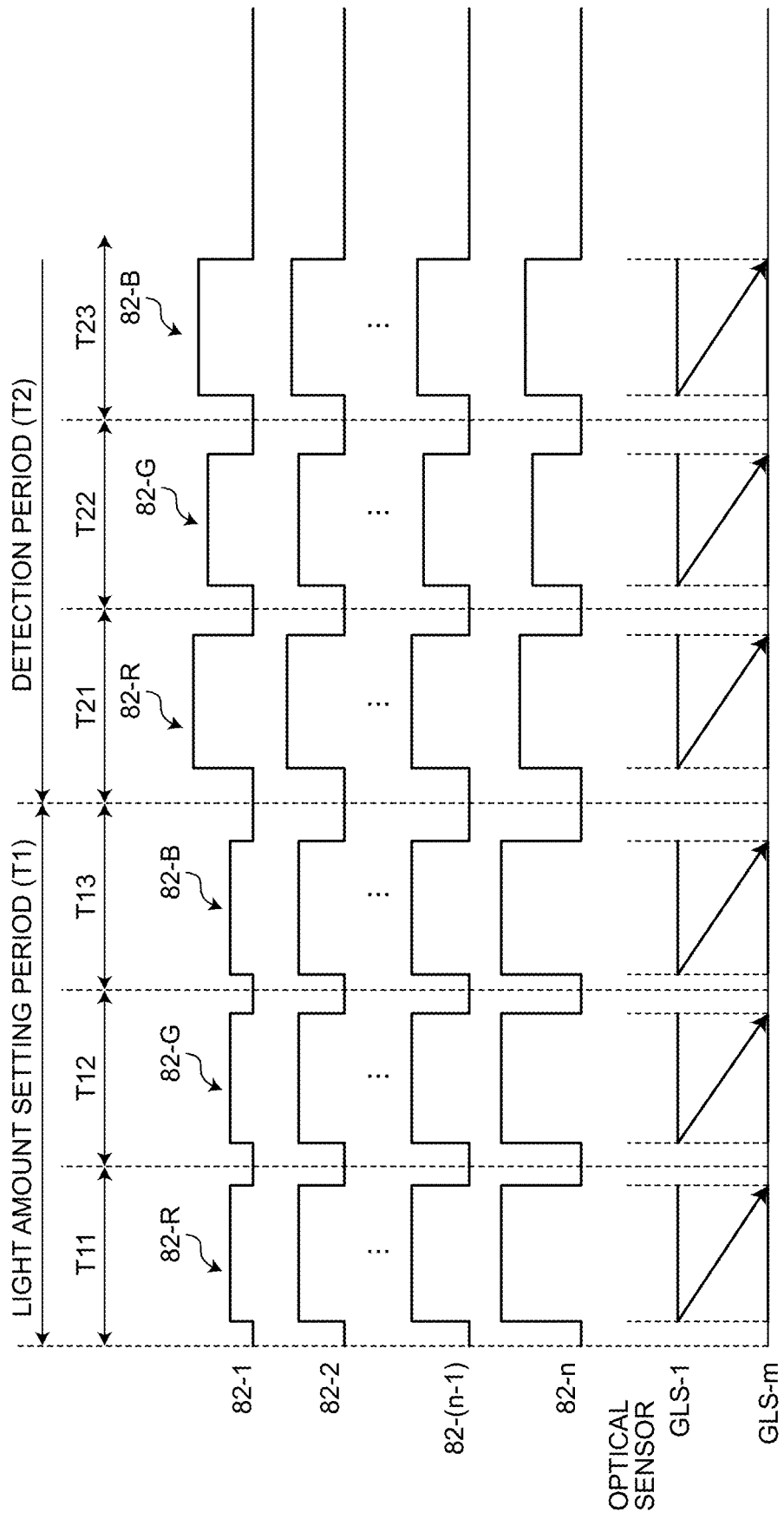
FIG. 16 is a timing waveform diagram for explaining an operation example of the detection device according to the third modification.

FIG. 16 is a timing waveform diagram for explaining an operation example of the detection device according to the third modification. As illustrated in FIG. 16, the detection device 1 executes the light amount setting mode described above in a light amount setting period T1. In a first period T11, the detection device 1 lights up the red light-emitting elements 82-R at different light amounts and sets the light amounts for detection of the red light-emitting elements 82-R based on the sensor values So corresponding to the red light and the target sensor value So-t. In the same way, in a second period T12, the detection device 1 lights up the green light-emitting elements 82-G at different light amounts and sets the light amounts for detection of the green light-emitting elements 82-G based on the sensor values So corresponding to the green light and the target sensor value So-t. In a third period T13, the detection device 1 lights up the blue light-emitting elements 82-B at different light amounts and sets the light amounts for detection of the blue light-emitting elements 82-B based on the sensor values So corresponding to the blue light and the target sensor value So-t.

After the light amount setting period T1, the detection device 1 executes the detection mode described above in a detection period T2. In a fourth period T21, the detection device 1 lights up the red light-emitting elements 82-R at the set light amounts for detection, and the photodiodes 30 of the optical sensor 10 output sensor values So(R) corresponding to the light amounts for detection. The sensor values So(R) are sensor values corresponding to the red light.

In the same way, in a fifth period T22, the detection device 1 lights up the green light-emitting elements 82-G at the set light amounts for detection, and the photodiodes 30 of the optical sensor 10 output sensor values So(G) corresponding to the light amounts for detection. The sensor values So(G) are sensor values corresponding to the green light. In a sixth period T23, the detection device 1 lights up the blue light-emitting elements 82-B at the set light amounts for detection, and the photodiodes 30 of the optical sensor 10 output sensor values So(B) corresponding to the light amounts for detection. The sensor values So(B) are sensor values corresponding to the blue light. The image generation circuit 76 (refer to FIG. 2) generates a color image based on the sensor values So(R), So(G), and So(B) from the photodiodes 30.

Fourth Modification

Figure 17:
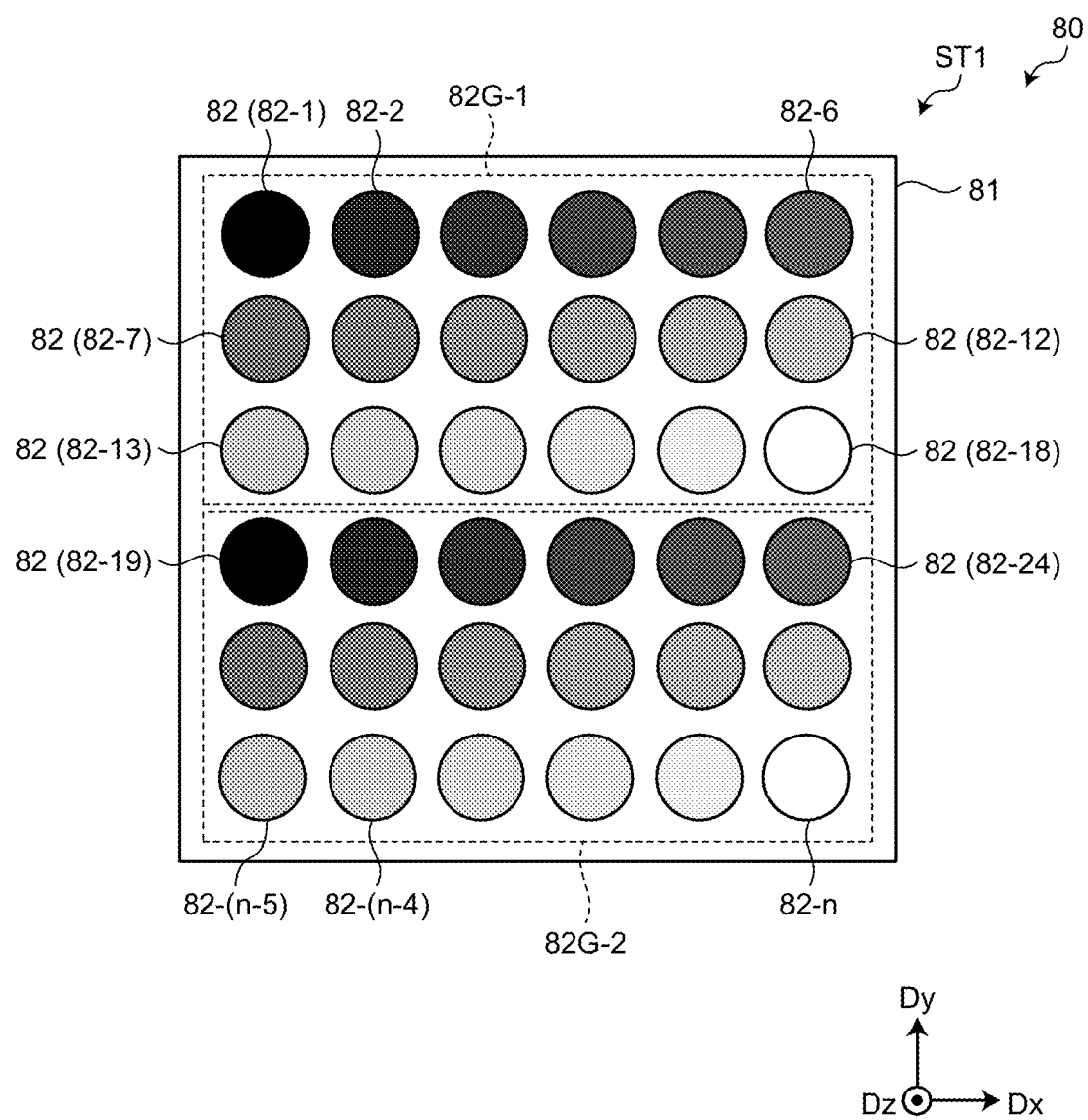
FIG. 17 is an explanatory view schematically illustrating the lighting pattern for adjusting the light amounts of the light-emitting elements of the detection device according to a fourth modification of the embodiment.

FIG. 17 is an explanatory view schematically illustrating the lighting pattern for adjusting the light amounts of the light-emitting elements of the detection device according to a fourth modification of the embodiment. With the lighting pattern for adjusting the light amounts illustrated in FIG. 10, the example has been described in which the light amounts of all the light-emitting elements 82 are made different. The lighting pattern for adjusting the light amounts is, however, not limited to this pattern, and can be changed as appropriate depending on the required detection accuracy, the resolution of the light amount, the number of the light-emitting elements 82, and the like.

As illustrated in FIG. 17, in the fourth modification, the light source device 80 includes light-emitting element groups 82G-1 and 82G-2 each including a plurality of the light-emitting elements 82. In the light amount setting mode, the light source device 80 differentiates the light amounts of the light-emitting elements 82 in each of the light-emitting element groups 82G-1 and 82G-2. The light-emitting element groups 82G-1 and 82G-2 are arranged adjacent to each other in the second direction Dy. Each of the light-emitting element groups 82G-1 and 82G-2 includes 18 light-emitting elements 82 in three rows and six columns.

In the light-emitting element group 82G-1, the light amount increases as the light-emitting element number increases from the light-emitting element 82-1 to the light-emitting element 82-18. In the light-emitting element group 82G-2, the light amount increases as the light-emitting element number increases from a light-emitting element 82-19 to the light-emitting element 82-n.

In the fourth modification, when the light amounts for detection are set, the difference in light amount between the adjacent light-emitting element numbers is larger than in FIG. 10, but the light amounts for detection can be set for each of areas of the light-emitting element groups 82G-1 and 82G-2.

Fifth Modification

Figure 18:
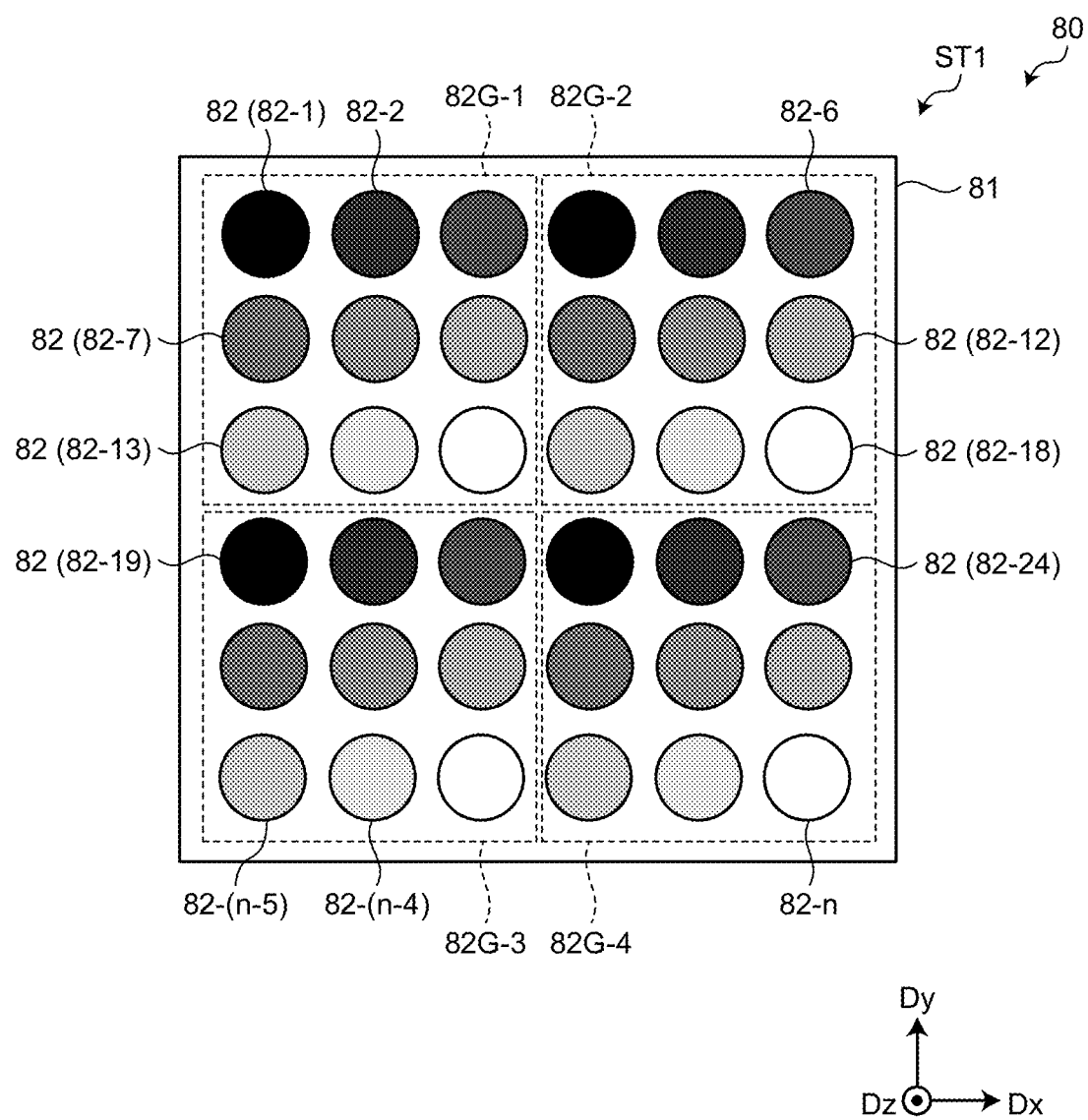
FIG. 18 is an explanatory view schematically illustrating the lighting pattern for adjusting the light amounts of the light-emitting elements of the detection device according to a fifth modification of the embodiment.

FIG. 18 is an explanatory view schematically illustrating the lighting pattern for adjusting the light amounts of the light-emitting elements of the detection device according to a fifth modification of the embodiment. As illustrated in FIG. 18, in the fifth modification, the light source device 80 includes light-emitting element groups 82G-1, 82G-2, 82G-3, and 82G-4 each including a plurality of the light-emitting elements 82. In the light amount setting mode, the light source device 80 differentiates the light amounts of the light-emitting elements 82 in each of the light-emitting element groups 82G-1, 82G-2, 82G-3, and 82G-4.

The light-emitting element groups 82G-1 and 82G-2 are arranged adjacent to each other in the first direction Dx. The light-emitting element groups 82G-3 and 82G-4 are arranged adjacent to each other in the first direction Dx. The light-emitting element groups 82G-1 and 82G-3 are arranged adjacent to each other in the second direction Dy. The light-emitting element groups 82G-2 and 82G-4 are arranged adjacent to each other in the second direction Dy. Each of the light-emitting element groups 82G-1, 82G-2, 82G-3, and 82G-4 includes 9 light-emitting elements 82 in three rows and three columns.

In the fifth modification, the light amounts for detection can be set for each of areas of the light-emitting element groups 82G-1, 82G-2, 82G-3, and 82G-4.

The number of the light-emitting element groups 82G and the number of the light-emitting elements 82 included in each of the light-emitting element groups 82G can be changed as appropriate. All the lighting patterns for adjusting the light amounts illustrated in FIGS. 10, 17, and 18 illustrate examples in which the light amount increases from the upper left toward the lower right. However, these examples are merely exemplary. The lighting pattern for adjusting the light amounts is not limited to these examples. In the lighting pattern for adjusting the light amounts, the pattern of different light amounts may be arranged in any way.

While the preferred embodiment of the present disclosure has been described above, the present disclosure is not limited to the embodiment described above. The content disclosed in the embodiment is merely an example, and can be variously modified within the scope not departing from the gist of the present disclosure. Any modifications appropriately made within the scope not departing from the gist of the present disclosure also naturally belong to the technical scope of the present disclosure. At least one of various omissions, substitutions, and changes of the components can be made without departing from the gist of the embodiment and the modifications described above.

What is claimed is:

1. A detection device comprising:
a planar detection device comprising a plurality of photodetection elements arranged in a planar configuration;
a plurality of point light sources provided correspondingly to the photodetection elements;
a light directivity control element disposed between the point light sources and the photodetection elements; and
a detection circuit electrically coupled to the photodetection elements, wherein
each of the point light sources corresponds to at least one of the photodetection elements, in a light amount setting mode:
the point light sources are controlled to be lit up at different light amounts;
the photodetection elements are configured to output a plurality of sensor values corresponding to the different light amounts;
the sensor values that are detected are compared with a preset target sensor value; and
light amounts for detection of the point light sources are set,
in a detection mode:
the point light sources are controlled to be lit up at the set light amounts for detection; and
the photodetection elements are configured to output sensor values corresponding to the light amounts for detection,
the light directivity control element, a light-transmitting placement substrate to place thereon a plurality of objects to be detected, and the point light sources are arranged sequentially on the planar detection device, in a vertical direction to the planar detection device,
the light-transmitting placement substrate being in direct contact with the light directivity control element, and
a distance between the light-transmitting placement substrate and the point light sources is greater than a distance between the light directivity control element and the light-transmitting placement substrate.

2. The detection device according to claim 1, wherein the photodetection elements are a plurality of photodiodes.

3. A detection device comprising:
a planar detection device comprising a plurality of photodetection elements arranged in a planar configuration;
a plurality of point light sources provided correspondingly to the photodetection elements;
a light directivity control element disposed between the point light sources and the photodetection elements; and
a detection circuit electrically coupled to the photodetection elements,
a light amount setting circuit configured to set light amounts of the point light sources, wherein
each of the point light sources corresponds to at least one of the photodetection elements,
in a light amount setting mode:
the point light sources are controlled to be lit up at different light amounts;
the photodetection elements are configured to output a plurality of sensor values corresponding to the different light amounts;
the sensor values that are detected are compared with a preset target sensor value; and
light amounts for detection of the point light sources are set,
in a detection mode:
the point light sources are controlled to be lit up at the set light amounts for detection; and
the photodetection elements are configured to output sensor values corresponding to the light amounts for detection, and
the light amount setting circuit is configured to:
select a first sensor value closest to the target sensor value from among the sensor values corresponding to the different light amount; and
set the light amounts for detection of the point light sources to a light amount of the point light source corresponding to the first sensor value.

4. The detection device according to claim 3, wherein the light directivity control element, a light-transmitting placement substrate to place thereon a plurality of objects to be detected, and the point light sources are arranged sequentially on the planar detection device in a vertical direction to the planar detection device.

5. The detection device according to claim 3, wherein the photodetection elements are a plurality of photodiodes.

6. A detection device comprising:
a planar detection device comprising a plurality of photodetection elements arranged in a planar configuration;
a plurality of point light sources provided correspondingly to the photodetection elements;
a light directivity control element disposed between the point light sources and the photodetection elements; and
a detection circuit electrically coupled to the photodetection elements,
a light amount setting circuit configured to set light amounts of the point light sources, wherein
each of the point light sources corresponds to at least one of the photodetection elements,
in a light amount setting mode:
the point light sources are controlled to be lit up at different light amounts;
the photodetection elements are configured to output a plurality of sensor values corresponding to the different light amounts;
the sensor values that are detected are compared with a preset target sensor value; and
light amounts for detection of the point light sources are set,
in a detection mode:
the point light sources are controlled to be lit up at the set light amounts for detection; and
the photodetection elements are configured to output sensor values corresponding to the light amounts for detection, and
the light amount setting circuit is configured to:
select a first sensor value and a second sensor value close to the target sensor value from among the sensor values corresponding to the different light amounts, the target sensor value being a value between the first sensor value and the second sensor value; and set, when a difference between the target sensor value and the first sensor value is equal to a difference between the target sensor value and the second sensor value, the light amounts for detection of the point light sources to an average value of a first light amount of the point light source corresponding to the first sensor value and a second light amount of the point light source corresponding to the second sensor value.

7. The detection device according to claim 6, wherein the photodetection elements are a plurality of photodiodes.

8. The detection device according to claim 6, wherein the light directivity control element, a light-transmitting placement substrate to place thereon a plurality of objects to be detected, and the point light sources are arranged sequentially on the planar detection device in a vertical direction to the planar detection device.

9. A detection device comprising:
a planar detection device comprising a plurality of photodetection elements arranged in a planar configuration;
a plurality of point light sources provided correspondingly to the photodetection elements;
a light directivity control element disposed between the point light sources and the photodetection elements; and
a detection circuit electrically coupled to the photodetection elements,
wherein
each of the point light sources corresponds to at least one of the photodetection elements,
in a light amount setting mode:
the point light sources are controlled to be lit up at different light amounts;
the photodetection elements are configured to output a plurality of sensor values corresponding to the different light amounts;
the sensor values that are detected are compared with a preset target sensor value; and
light amounts for detection of the point light sources are set,
in a detection mode:
the point light sources are controlled to be lit up at the set light amounts for detection; and
the photodetection elements are configured to output sensor values corresponding to the light amounts for detection,
the detection circuit has a detection range in which the sensor values from the photodetection elements are detectable, and
the target sensor value is set within a range from 90% to 100% with respect to an upper limit value of the detection range.

10. The detection device according to claim 9, wherein the photodetection elements are a plurality of photodiodes.

11. The detection device according to claim 9, wherein the light directivity control element, a light-transmitting placement substrate to place thereon a plurality of objects to be detected, and the point light sources are arranged sequentially on the planar detection device in a vertical direction to the planar detection device.

12. A detection device comprising:
a planar detection device comprising a plurality of photodetection elements arranged in a planar configuration;
a plurality of point light sources provided correspondingly to the photodetection elements;
a light directivity control element disposed between the point light sources and the photodetection elements; and
a detection circuit electrically coupled to the photodetection elements,
wherein
each of the point light sources corresponds to at least one of the photodetection elements,
in a light amount setting mode:
the point light sources are controlled to be lit up at different light amounts;
the photodetection elements are configured to output a plurality of sensor values corresponding to the different light amounts;
the sensor values that are detected are compared with a preset target sensor value; and
light amounts for detection of the point light sources are set,
in a detection mode:
the point light sources are controlled to be lit up at the set light amounts for detection; and
the photodetection elements are configured to output sensor values corresponding to the light amounts for detection,
the detection device further comprises a storage circuit to store therein the light amounts for detection set in the light amount setting mode, and
the detection device is configured to:
execute the light amount setting mode when the planar detection device starts measurement, and
simultaneously light up the point light sources at the set light amounts for detection in the detection mode.

13. The detection device according to claim 12, wherein the photodetection elements are a plurality of photodiodes.

14. The detection device according to claim 12, wherein the light directivity control element, a light-transmitting placement substrate to place thereon a plurality of objects to be detected, and the point light sources are arranged sequentially on the planar detection device in a vertical direction to the planar detection device.

* * * * *